United States Patent
He et al.

(10) Patent No.: US 11,851,599 B2
(45) Date of Patent: Dec. 26, 2023

(54) LIQUID CRYSTAL COMPOSITION AND LIQUID CRYSTAL DISPLAY DEVICE THEREOF

(71) Applicant: Jiangsu Hecheng Display Technology Co., Ltd., Yangzhong (CN)

(72) Inventors: Di He, Yangzhong (CN); Wenquan Ding, Yangzhong (CN); Haibin Xu, Yangzhong (CN); Shuang Xu, Yangzhong (CN); Lifang Yao, Yangzhong (CN)

(73) Assignee: Jiangsu Hecheng Display Technology Co., Ltd., Nanjing (CN)

(*) Notice: Subject to any disclaimer, the term of this patent is extended or adjusted under 35 U.S.C. 154(b) by 0 days.

(21) Appl. No.: 17/319,229

(22) Filed: May 13, 2021

(65) Prior Publication Data
US 2021/0363424 A1 Nov. 25, 2021

(30) Foreign Application Priority Data
May 15, 2020 (CN) .......................... 202010413412.3

(51) Int. Cl.
*G02F 1/1333* (2006.01)
*C09K 19/12* (2006.01)

(52) U.S. Cl.
CPC ........ *C09K 19/12* (2013.01); *C09K 2019/123* (2013.01); *C09K 2019/124* (2013.01)

(58) Field of Classification Search
CPC .... C09K 19/12; C09K 19/34; C09K 19/3441; C09K 19/3491; C09K 2019/123; C09K 2019/124; C09K 2019/122; C09K 2019/3408
See application file for complete search history.

(56) References Cited

U.S. PATENT DOCUMENTS

| | | |
|---|---|---|
| 2017/0362506 A1 | 12/2017 | Hirschmann et al. |
| 2018/0265785 A1 | 9/2018 | Yun et al. |
| 2019/0002430 A1* | 1/2019 | Manabe ............. C09K 19/3402 |
| 2019/0078021 A1* | 3/2019 | Wang ...................... G02F 1/137 |
| 2019/0185748 A1 | 6/2019 | Liao |
| 2019/0256775 A1* | 8/2019 | Wang ................. C09K 19/3405 |
| 2019/0345129 A1* | 11/2019 | Li .......................... C09K 19/068 |
| 2021/0363424 A1* | 11/2021 | He ........................... C09K 19/12 |

FOREIGN PATENT DOCUMENTS

| | | | | |
|---|---|---|---|---|
| CN | 107434973 A | * | 5/2016 | ............. C09K 19/44 |
| CN | 201700718 A | | 1/2017 | |
| CN | 107257839 A | | 10/2017 | |
| CN | 108624337 A | | 10/2018 | |
| CN | 109943351 A | | 6/2019 | |
| CN | 110922982 A | | 3/2020 | |
| TW | 201700718 A | | 1/2017 | |
| WO | 2019/121648 | * | 6/2019 | ............. C09K 19/34 |
| WO | 2019/121648 A1 | | 6/2019 | |
| WO | WO-2019121648 A1 | * | 6/2019 | ............. C09K 19/12 |

* cited by examiner

*Primary Examiner* — Geraldina Visconti
(74) *Attorney, Agent, or Firm* — Hoffmann & Baron, LLP

(57) ABSTRACT

A liquid crystal composition and a liquid crystal display device including the liquid crystal composition include at least one compound of general formula I and at least one compound of general formula II. Compared with the prior art, the liquid crystal composition has a smaller voltage change rate at high and low temperatures and a shorter low temperature response time, while maintaining an appropriate optical anisotropy, an appropriate clearing point, an appropriate absolute value of dielectric anisotropy, such that the liquid crystal display device having the liquid crystal composition has a better display and a faster response speed.

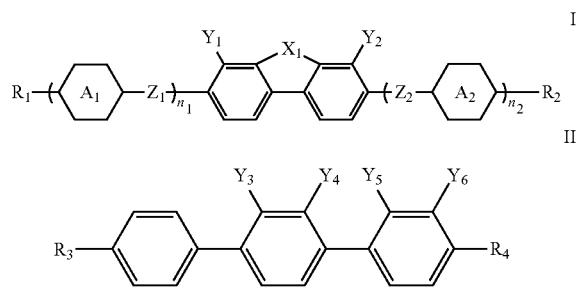

10 Claims, No Drawings

LIQUID CRYSTAL COMPOSITION AND LIQUID CRYSTAL DISPLAY DEVICE THEREOF

CROSS-REFERENCE TO RELATED APPLICATIONS

This application claims priority to and benefit of Chinese Patent Application No. 202010413412.3 filed on May 15, 2020. The contents of the above application are hereby expressly incorporated by reference in its entirety into the present application, including the contents and teachings of any references contained therein.

TECHNICAL FIELD

The present invention relates to the field of liquid crystal, in particular to a liquid crystal composition and a liquid crystal display device comprising the liquid crystal composition.

BACKGROUND ARTS

Up to now, liquid crystal has been widely used in the field of information display, and has also made some progresses in the application of optical communication. In recent years, the application of liquid crystal compounds has been significantly expanded to display devices, electro-optical devices, electronic elements, sensors and so on.

Based on the types of display mode, liquid crystal display elements can be classified into PC (phase change), TN (twisted nematic), STN (super twisted nematic), ECB (electrically controlled birefringence), OCB (optically compensated bend), IPS (in-plane switching), VA (vertical alignment), FFS (fringe field switching), FPA (field-induced photo-reactive alignment) and so forth. Based on the driving modes of elements, liquid crystal display elements can be classified into PM (passive matrix) type and AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high-temperature type and a low-temperature type according to the manufacturing process. Based on the types of light source, liquid crystal display elements can be classified into a reflection type utilizing a natural light, a transmission type utilizing a backlight, and a semi-transmission type utilizing both the natural light and the backlight.

Liquid crystal materials need to have appropriately high dielectric anisotropy and optical anisotropy as well as a good low-temperature mutual solubility. Besides, liquid crystal materials also should have a low viscosity, a shorter response time, a low threshold voltage and an appropriately high contrast ratio. Performances of the liquid crystal composition would be further explained according to the market selling liquid crystal display elements. The temperature range of nematic phase temperature range is associated with the operating temperature range of the elements. A preferred upper limit temperature of the nematic phase is 70° C. or higher and a preferred lower limit temperature of the nematic phase is about −10° C. or lower. The viscosity of the liquid crystal composition is associated with response times of the elements. It is preferred that the response time is short so as to display dynamic images. Therefore, a liquid crystal composition with a faster response speed, especially a faster response speed at low temperature, is preferred.

Response speed is an important evaluation index of liquid crystal display device. If response speed is too slow, ghosting phenomenon will occur on the display panel, especially in applications with low temperature use requirements of end customers, such as cell phones, tablet computers, display devices for outdoor work (electricity meters), aerospace display devices and light valves. And in the applications of these aspects, a widest possible use temperature range with the center of room temperature is further required. Therefore, it is also required the liquid crystal composition has a higher clearing point and a faster response at low temperature.

From the perspective of the preparation of liquid crystal materials, the performances of liquid crystal materials are interdependent, and the improvement of one performance index may make other performances change. Therefore, the preparation of liquid crystal materials with suitable performances in all aspects often requires creative labor.

SUMMARY OF THE INVENTION

Objects: In view of the deficiencies in the prior art, it is an object of the present invention to provide a liquid crystal composition having a smaller voltage change rate at high and low temperatures and a shorter low temperature response time while maintaining an appropriate optical anisotropy, an appropriate clearing point and an appropriate absolute value of dielectric anisotropy.

Another object of the present invention is to provide a liquid crystal display device comprising the above liquid crystal composition, which is especially applicable to VA, IPS or FFS display elements.

Technical Solutions

To realize the above invention objects above, the present invention provides a liquid crystal composition comprising:
at least one compound of general formula I

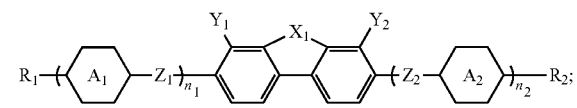

and
at least one compound of general formula II

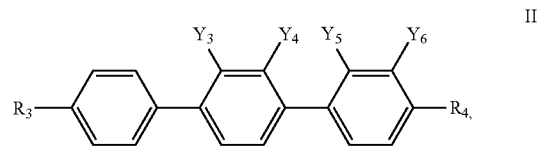

in which,
$R_1$ and $R_2$ each independently represents —H, halogen, $C_{1-12}$ linear or branched alkyl,

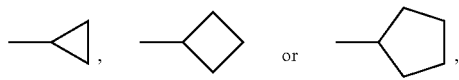

wherein one or more nonadjacent —CH$_2$— in the C$_{1-12}$ linear or branched alkyl can each be independently replaced by —CH=CH—, —C≡C—, —O—, —CO—, —CO—O— or —O—CO—, and one or more —H in aforementioned groups can each be independently substituted by —F or —Cl;

R$_3$ and R$_4$ each independently represents C$_{1-12}$ linear or branched alkyl,

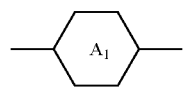

wherein one or more nonadjacent —CH$_2$— in the C$_{1-12}$ linear or branched alkyl can each be independently replaced by —CH=CH—, —C≡C—, —O—, —CO—, —CO—O— or —O—CO—;

ring

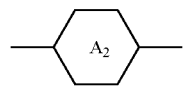

and ring

each independently represents

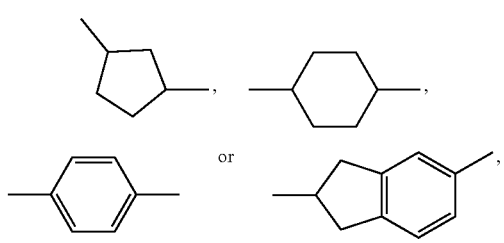

wherein one or more —CH$_2$— in

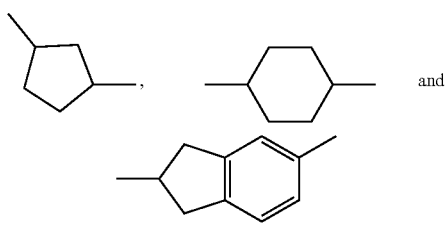

can be replaced by —O—, and one or more single bond in the rings can be replaced by double bond, wherein one or more —H on

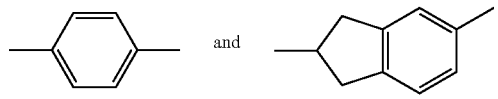

can each be independently substituted by —F, —Cl, —CN, —CH$_3$ or —OCH$_3$, and one or more —CH= in the rings can be replaced by —N=;

X$_1$ represents —O—, —S—, —CO—, —CF$_2$—, —NH— or —NF—;

Y$_1$, Y$_2$, Y$_3$, Y$_4$, Y$_5$ and Y$_6$ each independently represents —H, halogen, C$_{1-3}$ halogenated or unhalogenated alkyl, or C$_{1-3}$ halogenated or unhalogenated alkoxy;

Z$_1$ and Z$_2$ each independently represents single bond, —O—, —S—, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—; and n$_1$ and n$_2$ each independently represents 0, 1 or 2, wherein when n$_1$=2, ring

can be same or different, Z$_1$ can be same or different; wherein when n$_2$=2, ring

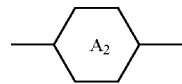

can be same or different, Z$_2$ can be same or different.

In some embodiments of the present invention, preferably, X$_1$ represents O, S, CO or —NH—; further preferably, X$_1$ represents —O—, —S— or —CO—.

In some embodiments of the present invention, preferably, Y$_1$ and Y$_2$ each independently represents —H, —F, —Cl, —CH$_3$, —OCH$_3$, —CF$_3$ or —OCF$_3$; further preferably, Y$_1$ and Y$_2$ each independently represents —H, —F or —Cl.

In some embodiments of the present invention, preferably, Z$_1$ and Z$_2$ each independently represents single bond, —O—, —S—, —CO—O—, —O—CO—, —CH$_2$O—, —OCH$_2$—, —CH$_2$CH$_2$—, —CF$_2$CF$_2$—, —CF$_2$O— or —OCF$_2$—.

In some embodiments of the present invention, preferably, ring

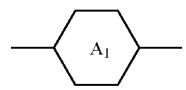

and ring

each independently represents

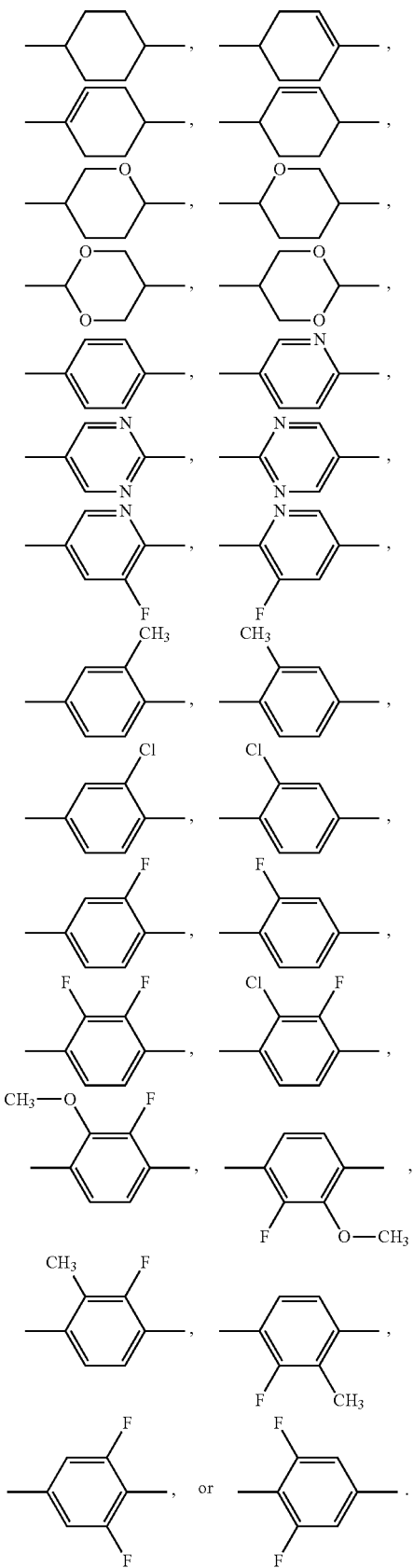

or

In some embodiments of the present invention, the compound of general formula I is selected from a group consisting of the following compounds:

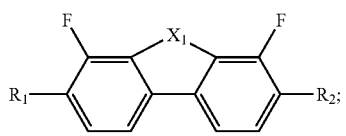
I-1

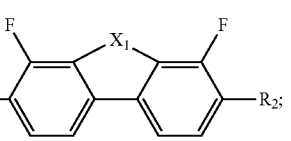
I-2

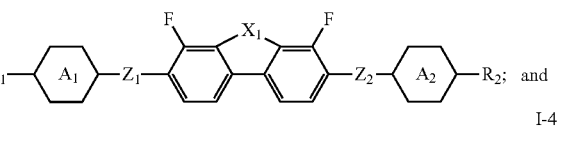
I-3; and

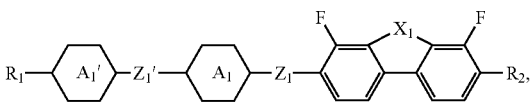
I-4 in which,
ring

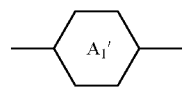

is defined the same as ring

;

$Z_1'$ is defined the same as $Z_1$;
$X_1$ represents —O—, —S— or —CO—.

In some embodiments of the present invention, preferably, $R_1$ and $R_2$ each independently represents halogen, $C_{1-10}$ halogenated or unhalogenated linear or branched alkyl, $C_{1-9}$ halogenated or unhalogenated linear or branched alkoxy, $C_{2-10}$ halogenated or unhalogenated linear or branched alkenyl; further preferably, $R_1$ and $R_2$ each independently represents halogen, $C_{1-8}$ halogenated or unhalogenated linear or branched alkyl, $C_{1-7}$ halogenated or unhalogenated linear or branched alkoxy, $C_{2-8}$ halogenated or unhalogenated linear or branched alkenyl; more further preferably, $R_1$ and $R_2$ each independently represents halogen, $C_{1-5}$ halogenated or unhalogenated linear or branched alkyl, $C_{1-4}$ halogenated or unhalogenated linear or branched alkoxy, $C_{2-5}$ halogenated or unhalogenated linear or branched alkenyl.

In some embodiments of the present invention, preferably, $R_1$ and $R_2$ each independently represents —F, —Cl, $C_{1-5}$ halogenated or unhalogenated linear or branched alkyl, $C_{1-4}$ halogenated or unhalogenated linear or branched alkoxy, $C_{2-5}$ halogenated or unhalogenated linear or branched alkenyl.

In some embodiments of the present invention, in order to keep good thermal stability and light stability, $R_1$ and $R_2$ are preferably alkyl; in order to improve the dielectric anisotropy, $R_1$ and $R_2$ are preferably alkoxy; in order to keep smaller viscosity and faster response speed, $R_1$ and $R_2$ are preferably alkenyl; in order to keep smaller viscosity, wider nematic phase temperature range and faster response speed, the terminal groups of $R_1$ and $R_2$ are preferably not alkenyl, and further preferably, $R_1$ and $R_2$ are alkenyl and the terminal groups of $R_1$ and $R_2$ are alkyl.

The lower limit of the weight percentage of the compound of general formula I is 0.1%, 0.5%, 1%, 1.5%, 2%, 3%, 4%, 5%, 6%, 7%, 8%, 9%, 10%, 12%, 14% or 15%, relative to the total weight of the liquid crystal composition of the present invention; and the upper limit of the weight percentage of the compound of general formula I is 40%, 38%, 36%, 34%, 32%, 30%, 28%, 26%, 25%, 24%, 20%, 18%, 16%, 15%, 14%, 12% or 10%, relative to the total weight of the liquid crystal composition of the present invention.

In some embodiments of the present invention, the compound of general formula I provides 0.1-40 wt. % of the total weight of the liquid crystal composition; preferably, the compound of general formula I provides 0.1-25 wt. % of the total weight of the liquid crystal composition.

In some embodiments of the present invention, $Y_3$, $Y_4$, $Y_5$ and $Y_6$ each independently represents —H, —F, —Cl, —CH$_3$, —OCH$_3$, —CF$_3$ or —OCF$_3$; preferably, $Y_3$, $Y_4$, $Y_5$ and $Y_6$ each independently represents —H, —F, —Cl, —CH$_3$; further preferably, $Y_3$, $Y_4$, $Y_5$ and $Y_6$ each independently represents —H, —F, or —Cl.

In some embodiments of the present invention, the compound of general formula II is selected from a group consisting of the following compounds:

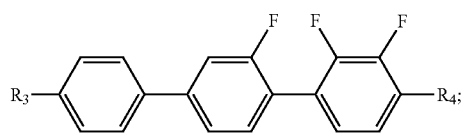

II-1

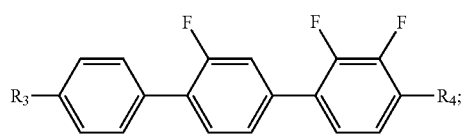

II-2

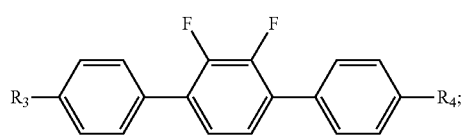

II-3

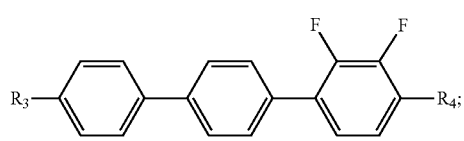

II-4

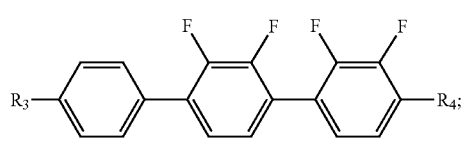

II-5

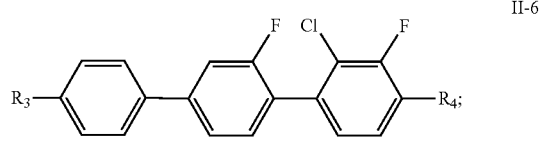

II-6

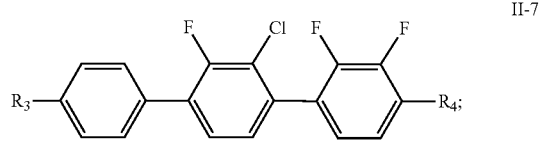

II-7

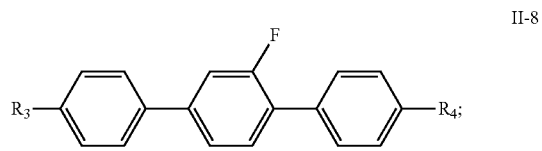

II-8

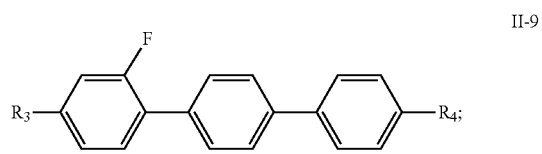

II-9

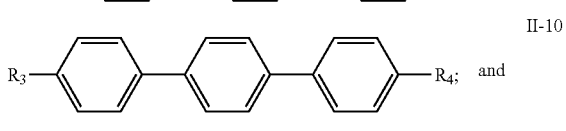

II-10 and

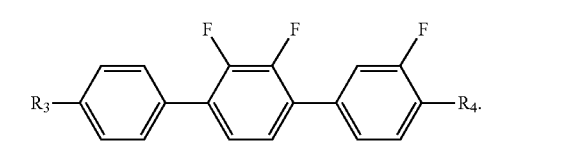

II-11

In some embodiments of the present invention, preferably, $R_3$ and $R_4$ each independently represents $C_{1-10}$ linear or branched alkyl, $C_{1-9}$ linear or branched alkoxy, or $C_{2-10}$ linear or branched alkenyl; further preferably, $R_3$ and $R_4$ each independently represents $C_{1-8}$ linear or branched alkyl, $C_{1-7}$ linear or branched alkoxy, or $C_{2-8}$ linear or branched alkenyl; more further preferably, $R_3$ and $R_4$ each independently represents $C_{1-5}$ linear or branched alkyl, $C_{1-4}$ linear or branched alkoxy, or $C_{2-5}$ linear or branched alkenyl.

The lower limit of the weight percentage of the compound of general formula II is 0.1%, 0.5%, 1%, 2%, 4%, 6%, 8%, 9%, 10%, 12%, 14%, 16%, 20%, 25%, 28% or 30%, relative to the total weight of the liquid crystal composition of the present invention; and the upper limit of the weight percentage of the compound of general formula II is 70%, 68%, 65%, 60%, 58%, 55%, 50%, 48%, 45%, 40%, 38%, 35%, 30%, 28% or 25%, relative to the total weight of the liquid crystal composition of the present invention.

In some embodiments of the present invention, the compound of general formula II provides 0.1-70 wt. % of the total weight of the liquid crystal composition; preferably, the compound of general formula II provides 0.1-40 wt. % of the total weight of the liquid crystal composition.

In some embodiments of the present invention, the liquid crystal composition of the present invention further comprises at least one compound of general formula III:

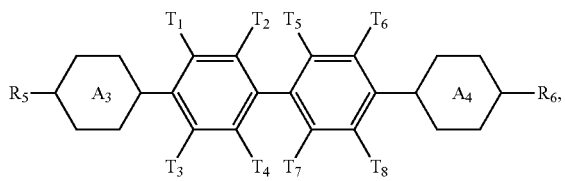

in which,

R₅ and R₆ each independently represents halogen, $C_{1-12}$ linear or branched alkyl,

wherein one or more nonadjacent —CH₂— in the $C_{1-12}$ linear or branched alkyl can each be independently replaced by —CH═CH—, —C≡C—, —O—, —CO—, —CO—O— or —O—CO—, and one or more —H in aforementioned groups can each be independently substituted by —F or —Cl;

ring

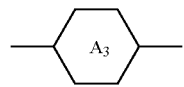

and ring

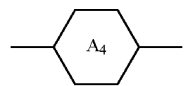

each independently represents

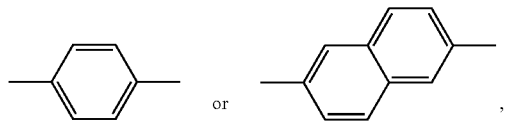

wherein one or more —H on

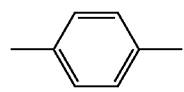

and

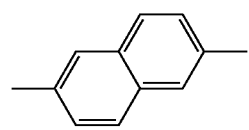

can each be independently substituted by —F, —Cl, —CN, —CH₃ or —OCH₃, and one or more —CH═ in the rings can be replaced by —N═;

$T_1$, $T_2$, $T_3$, $T_4$, $T_5$, $T_6$, $T_7$ and $T_8$ each independently represents —H, —F, —Cl, —CN, —CH₃ or —OCH₃.

In some embodiments of the present invention, the compound of general formula III is selected from a group consisting of the following compounds:

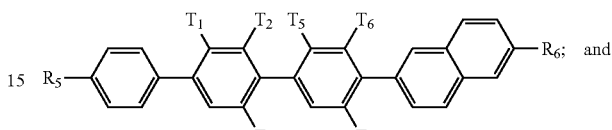

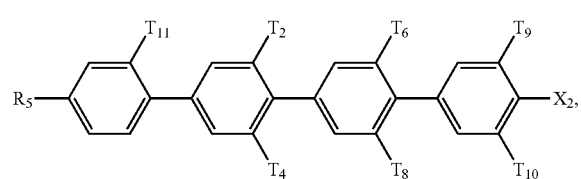

in which,

R₅ and R₆ each independently represents $C_{1-10}$ linear or branched alkyl,

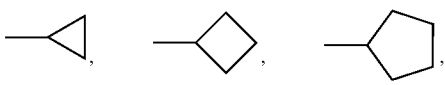

$C_{1-9}$ linear or branched alkoxy, or $C_{2-10}$ linear or branched alkenyl;

$T_9$, $T_{10}$ and $T_{11}$ each independently represents —H, —F, —Cl, —CN, —CH₃ or —OCH₃; and X₂ represents —F, —CF₃, —OCF₃ or —CH₂CH₂CH═CF₂.

In some embodiments of the present invention, R₅ and R₆ each independently represents $C_{1-8}$ linear or branched alkyl,

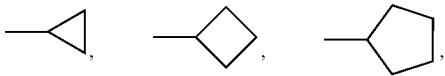

$C_{1-7}$ linear or branched alkoxy, or $C_{2-8}$ linear or branched alkenyl; preferably, R₅ and R₆ each independently represents $C_{1-5}$ linear or branched alkyl,

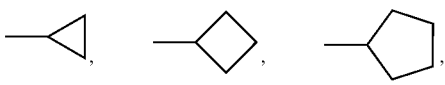

$C_{1-4}$ linear or branched alkoxy, or $C_{2-5}$ linear or branched alkenyl.

The lower limit of the weight percentage of the compound of general formula III is 0.1%, 0.5%, 1%, 1.5%, 2%, 4%, 6%, 8%, 10%, 12%, 14%, 18%, 20% or 25%, relative to the total weight of the liquid crystal composition of the present invention; and the upper limit of the weight percentage of the compound of general formula III is 50%, 45%, 40%, 35%, 30%, 28%, 26%, 24%, 20%, 18%, 16% or 15%, relative to the total weight of the liquid crystal composition of the present invention.

In some embodiments of the present invention, the compound of general formula III provides 0.1-50 wt. % of the total weight of the liquid crystal composition; preferably, the compound of general formula III provides 0.1-30 wt. % of the total weight of the liquid crystal composition.

In some embodiments of the present invention, the liquid crystal composition further comprises at least one compound of general formula M:

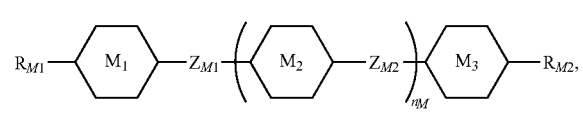

in which, $R_{M1}$ and $R_{M2}$ each independently represents $C_{1-12}$ linear or branched alkyl,

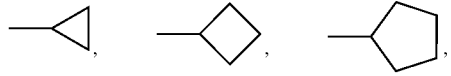

wherein one or more nonadjacent —CH$_2$— in the $C_{1-12}$ linear or branched alkyl can each be independently replaced by —CH=CH—, —C≡C—, —O—, —CO—, —CO—O— or —O—CO—;

ring

ring

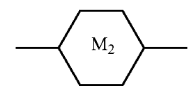

and ring

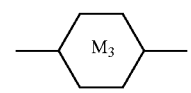

each independently represents

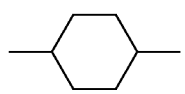 or 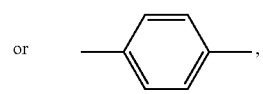, wherein one or more —CH$_2$— in

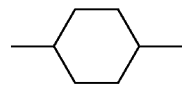

can be replaced by —O—, one or more single bond in the ring can be replaced by double bond, wherein at most one —H on

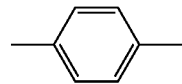

can be substituted by halogen;

$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and $n_M$ represents 0, 1 or 2, wherein when $n_M$=2, ring

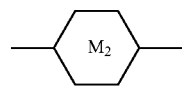

can be same or different, $Z_{M2}$ can be same or different; and when $n_M$=1 or 2, at least one of ring

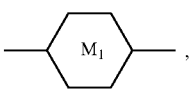, ring

and ring

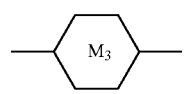

is non-aromatic ring.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

 (V1)

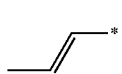 (V2)

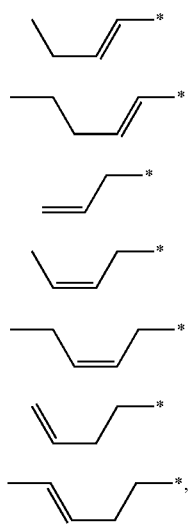

(V3)
(V4)
(V5)
(V6)
(V7)
(V8)
(V9)

in which, * represents bound carbon atom in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

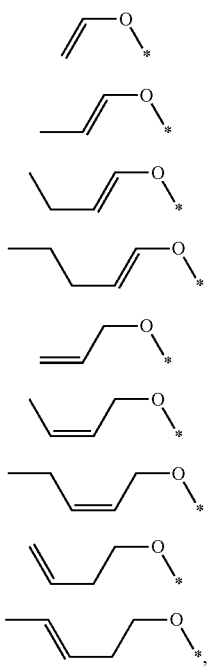

(OV1)
(OV2)
(OV3)
(OV4)
(OV5)
(OV6)
(OV7)
(OV8)
(OV9)

in which, * represents bound carbon atom in the ring structure.

In some embodiments of the present invention, the compound of general formula M is selected from a group consisting of the following compounds:

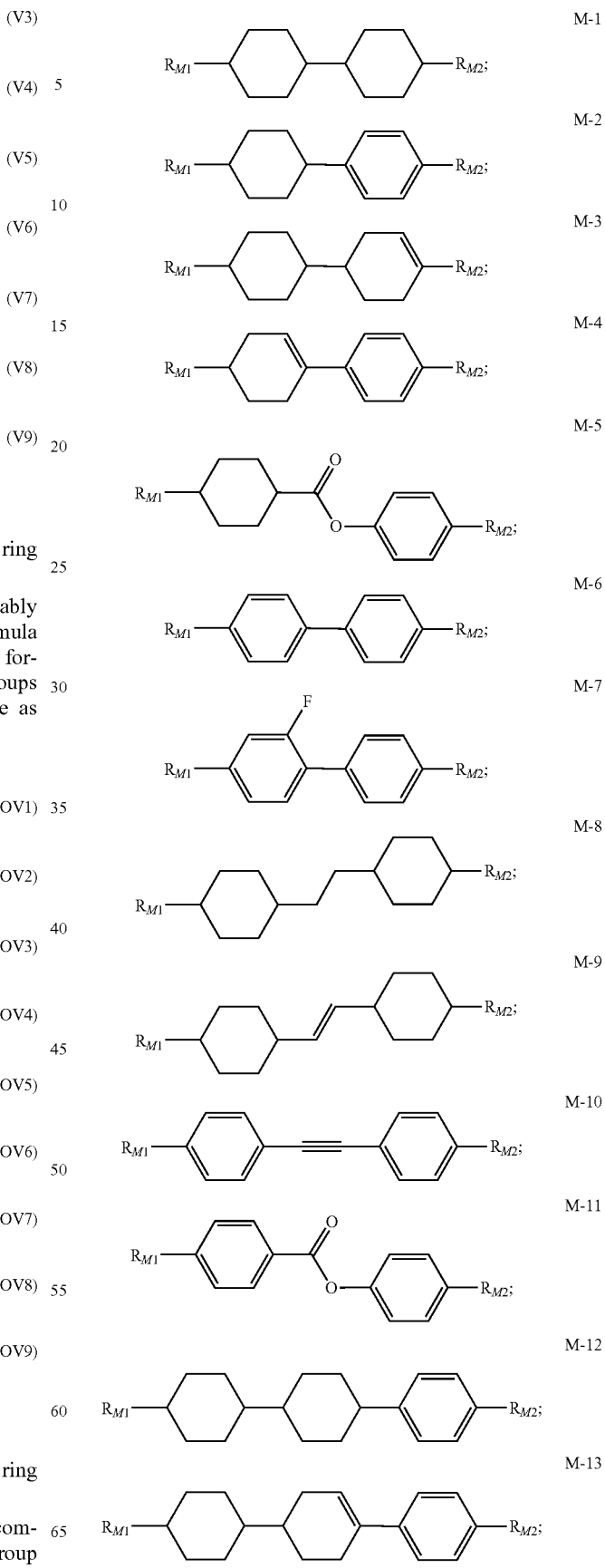

M-1; M-2; M-3; M-4; M-5; M-6; M-7; M-8; M-9; M-10; M-11; M-12; M-13

M-14

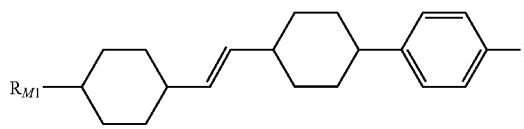

M-15

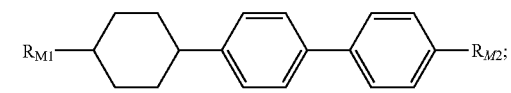

M-16

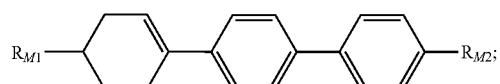

M-17

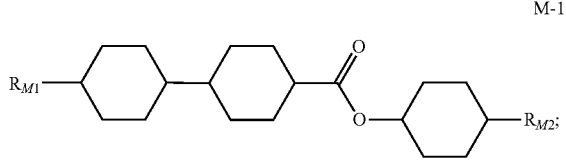

M-18

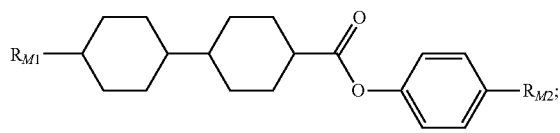

M-19

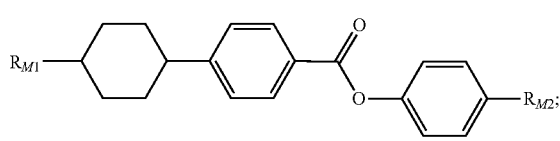

M-20

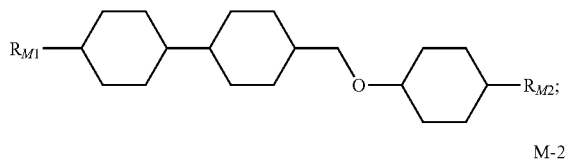

M-21

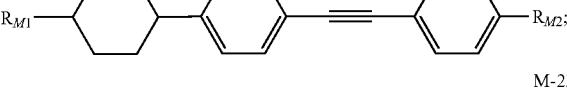

M-22

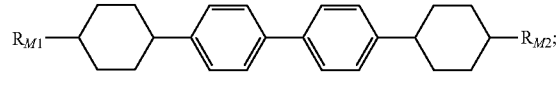

M-23

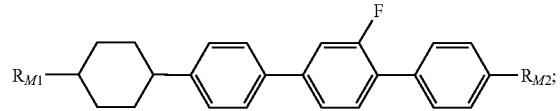

M-24

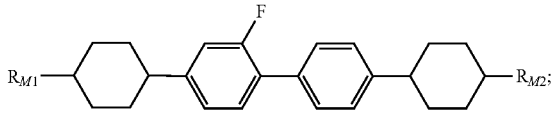

M-25

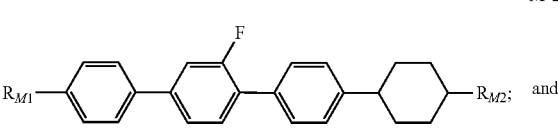

M-26

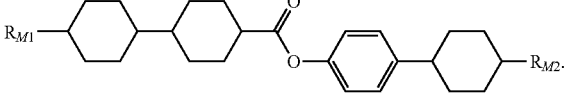

M-27

In some embodiments of the present invention, preferably, $R_{M1}$ and $R_{M2}$ each independently represents $C_{1-10}$ linear alkyl, $C_{1-9}$ linear alkoxy, or $C_{2-10}$ linear alkenyl; further preferably, $R_{M1}$ and $R_{M2}$ each independently represents $C_{1-8}$ linear alkyl, $C_{1-7}$ linear alkoxy, or $C_{2-8}$ linear alkenyl; more further preferably, $R_{M1}$ and $R_{M2}$ each independently represents $C_{1-5}$ linear alkyl, $C_{1-4}$ linear alkoxy, or $C_{2-5}$ linear alkenyl.

In some embodiments of the present invention, preferably, $R_{M1}$ and $R_{M2}$ each independently represents $C_{2-8}$ linear alkenyl; further preferably, $R_{M1}$ and $R_{M2}$ each independently represents $C_{2-5}$ linear alkenyl.

In some embodiments of the present invention, preferably, one of $R_{M1}$ and $R_{M2}$ represents $C_{2-5}$ linear alkenyl and the other represents $C_{1-5}$ linear alkyl.

In some embodiments of the present invention, preferably, $R_{M1}$ and $R_{M2}$ each independently represents $C_{1-8}$ linear alkyl, or $C_{1-7}$ linear alkoxy; further preferably, $R_{M1}$ and $R_{M2}$ each independently represents C linear alkyl, $C_{1-4}$ linear alkoxy.

In some embodiments of the present invention, preferably, one of $R_{M1}$ and $R_{M2}$ represents C linear alkyl, and the other represents C linear alkyl, or $C_{1-4}$ linear alkoxy; further preferably, $R_{M1}$ and $R_{M2}$ each independently represents C linear alkyl.

In some embodiments of the present invention, the content of the compound of general formula M must be appropriately adjusted depending on the required performance such as low temperature solubility, transition temperature, electrical reliability, birefringence index, process adaptability, drop trace, "burn-in", dielectric anisotropy and so on.

The lower limit of the weight percentage of the compound of general formula M is 20%, 22%, 24%, 26%, 28%, 30%, 35%, 40%, 45% or 50%, relative to the total weight of the liquid crystal composition of the present invention; and the upper limit of the weight percentage of the compound of general formula M is 70%, 65%, 60%, 58%, 56%, 55.5%, 54%, 52%, 50%, 45.5%, 45%, 40.5%, 40%, 38.5%, 37.5%, 36.5%, 35%, 30%, 28% or 25%, relative to the total weight of the liquid crystal composition of the present invention.

In some embodiments of the present invention, the compound of general formula M provides 20-70 wt. % of the total weight of the liquid crystal composition; preferably, the compound of general formula M provides 20-55 wt. % of the total weight of the liquid crystal composition.

The lower limit and the upper limit of the content of the compound of general Formula M are preferably higher when it is desired to maintain the liquid crystal composition of the present invention with a lower viscosity and a shorter response time. Further, the lower limit and the upper limit of the content of the compound of general Formula M are preferably higher when it is desired to maintain the liquid crystal composition of the present invention with a higher clearing point and a good temperature stability. In addition, the lower limit and the upper limit of the content of the compound of general Formula M are preferably decreased in order to maintain the driving voltage lower and make the absolute value of the dielectric anisotropy larger.

In some embodiments of the present invention, with emphasis in reliability, both $R_{M1}$ and $R_{M2}$ are preferably each independently alkyl; with emphasis in reducing the volatility of the compound, both $R_{M1}$ and $R_{M2}$ are preferably each independently alkoxy; and with emphasis in reducing the viscosity, at least one of $R_{M1}$ and $R_{M2}$ is preferably alkenyl.

In some embodiments of the present invention, the liquid crystal composition further comprises at least one compound of general formula N:

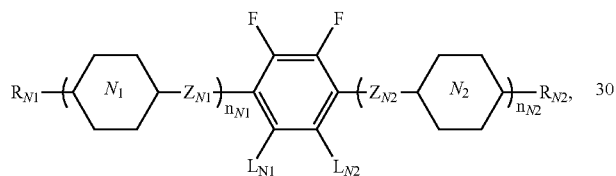

in which, $R_{N1}$ and $R_{N2}$ each independently represents $C_{1-12}$ linear or branched alkyl,

wherein one or more nonadjacent —CH$_2$— in the $C_{1-12}$ linear or branched alkyl can each be independently replaced by —CH=CH—, —C≡C—, —O—, —CO—, —CO—O— or —O—CO—;

ring

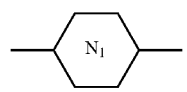

and ring

each independently represents

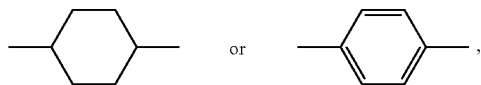

wherein one or more —CH$_2$— in

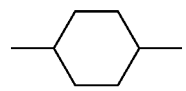

can be replaced by —O—, and one or more single bond in the ring can be replaced by double bond, wherein one or more —H on

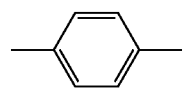

can each be independently substituted by —F, —Cl, —CN, —CH$_3$ or —OCH$_3$, and one or more —CH= in the ring can be replaced by —N=;

$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;

$L_{N1}$ and $L_{N2}$ each independently represents —H, $C_{1-3}$ alkyl or halogen;

$n_{N1}$ represents 0, 1, 2 or 3, $n_{N2}$ represents 0 or 1 and $0 \le n_{N1}+n_{N2} \le 3$, wherein when $n_{N1}$=2 or 3, ring

can be same or different, $Z_{N1}$ can be same or different;

when $0 \le n_{N1}+n_{N2} \le 2$, compounds of general formula N do not comprise terphenyl structure; and when $n_{N1}+n_{N2}$=3, compounds of general formula N do not comprise quaterphenyl structure.

In some embodiments of the present invention, preferably, ring

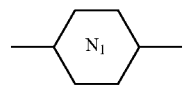

and ring

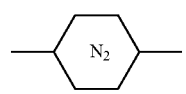

each independently represents
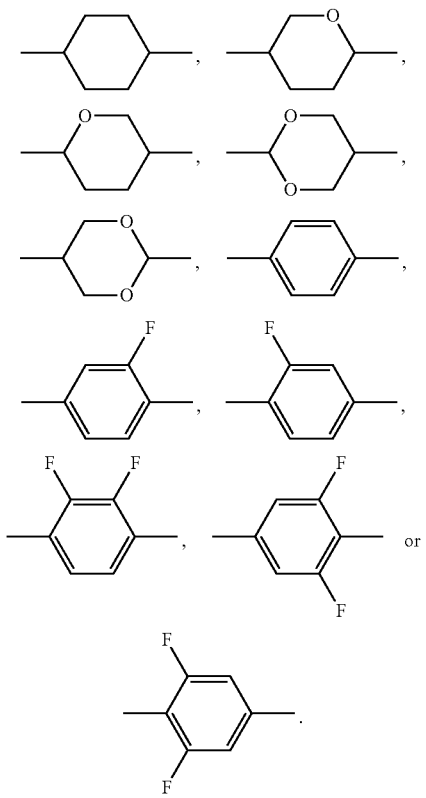
In some embodiments of the present invention, the compound of general formula N is selected from a group consisting of the following compounds:
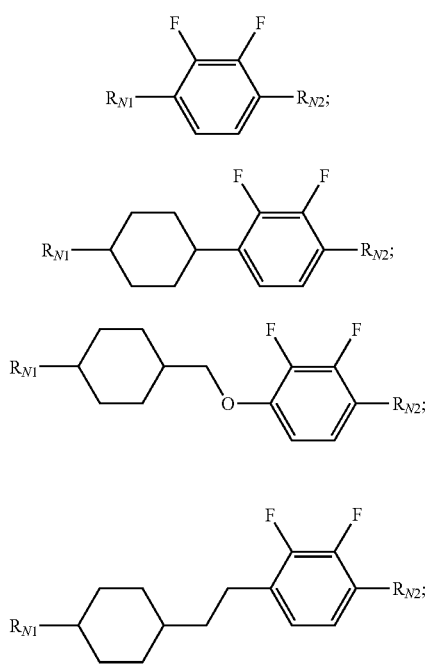
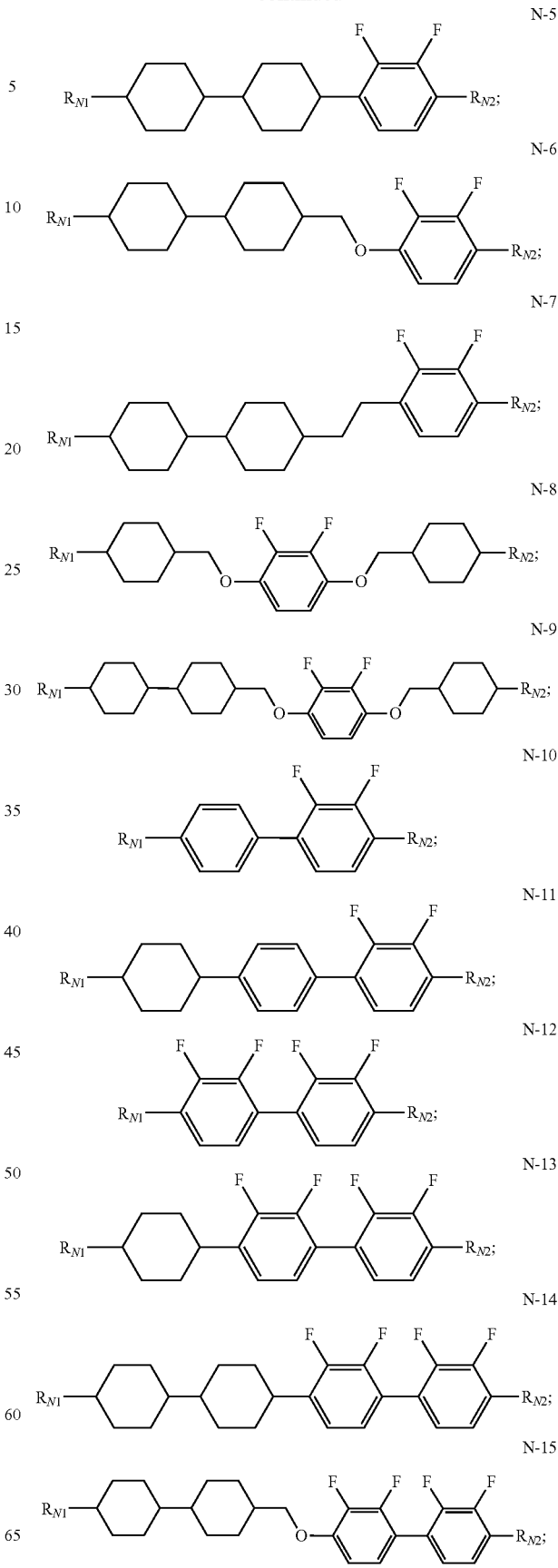

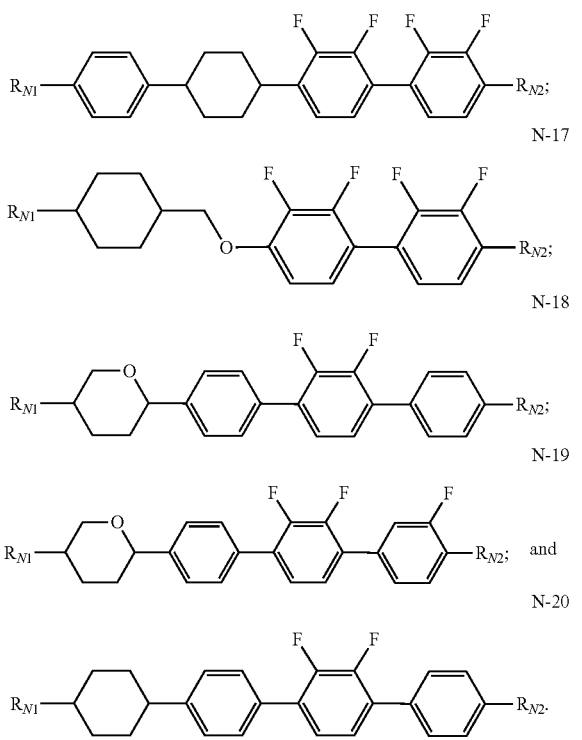

The lower limit of the weight percentage of the compound of general formula N is 1%, 2%, 4%, 6%, 8%, 10%, 15%, 16%, 18%, 20%, 22%, 23.5%, 24%, 26%, 28%, 30%, 35%, 37.5%, 40% or 45%, relative to the total weight of the liquid crystal composition of the present invention; and the upper limit of the weight percentage of the compound of general formula N is 60%, 58%, 56%, 54.5%, 54%, 53.5%, 52%, 50%, 49.5%, 45.5%, 45%, 40%, 37.5%, 36.5%, 35%, 30%, 28%, 25%, 24%, 23.5%, 22%, 20%, 18% or 15%, relative to the total weight of the liquid crystal composition of the present invention.

In some embodiments of the present invention, the compound of general formula N provides 1-60 wt. % of the total weight of the liquid crystal composition; preferably, the compound of general formula N provides 3-60 wt. % of the total weight of the liquid crystal composition; further preferably, the compound of general formula N provides 5-60 wt. % of the total weight of the liquid crystal composition.

In some embodiments of the present invention, the lower limit and the upper limit of the content of the compound of general Formula N are preferably lower when it is desired to maintain the liquid crystal composition of the present invention with a lower viscosity and a shorter response time. Further, the lower limit and the upper limit of the content of the compound of general Formula N are preferably lower when it is desired to maintain the liquid crystal composition of the present invention with a higher clearing point and a good temperature stability. In addition, the lower limit and the upper limit of the content of the compound of general Formula N are preferably increased in order to maintain the driving voltage lower and make the absolute value of the dielectric anisotropy larger.

In some embodiments of the present invention, preferably, $R_{N1}$ and $R_{N2}$ each independently represents $C_{1-10}$ linear or branched alkyl, $C_{1-9}$ linear or branched alkoxy, or $C_{2-10}$ linear or branched alkenyl; further preferably, $R_{N1}$ and $R_{N2}$ each independently represents $C_{1-8}$ linear or branched alkyl, $C_{1-7}$ linear or branched alkoxy, or $C_{2-8}$ linear or branched alkenyl; more further preferably, $R_{N1}$ and $R_{N2}$ each independently represents $C_{1-5}$ linear or branched alkyl, $C_{1-4}$ linear or branched alkoxy, or $C_{2-5}$ linear or branched alkenyl.

In some embodiments of the present invention, $R_{N1}$ is further preferably $C_{1-5}$ linear or branched alkyl, or $C_{2-5}$ linear or branched alkenyl; and more further preferably $C_{2-5}$ linear or branched alkyl, or $C_{2-3}$ linear or branched alkenyl; $R_{N2}$ is further preferably $C_{1-5}$ linear or branched alkoxy.

In some embodiments of the present invention, the liquid crystal composition further comprises at least one compound selected from a group consisting of compounds of general formula A-1 and general formula A-2:

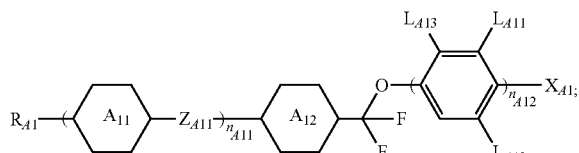

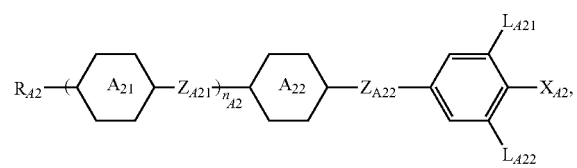

in which, $R_{A1}$ and $R_{A2}$ each independently represents $C_{1-12}$ linear or branched alkyl,

wherein one or more nonadjacent —CH$_2$— in the $C_{1-12}$ linear or branched alkyl can each be independently replaced by —CH=CH—, —C≡C—, —O—, —CO—, —CO—O— or —O—CO—, and one or more —H in the $C_{1-12}$ linear or branched alkyl,

can each be independently substituted by —F or —Cl;

ring

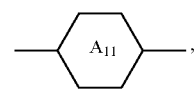

ring

ring

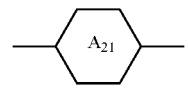

and ring

each independently represents

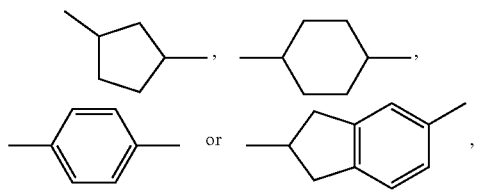

wherein one or more —CH$_2$— in

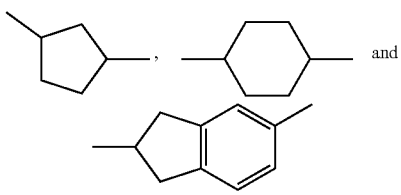

can be replaced by —O—, and one or more single bond in the rings can be replaced by double bond, wherein one or more —H on

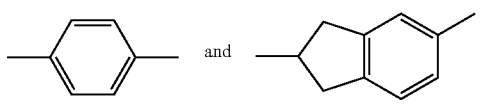

can each be independently substituted by —F, —Cl, —CN, —CH$_3$ or —OCH$_3$, and one or more —CH= in the rings can be replaced by —N=;

$Z_{A11}$, $Z_{A21}$ and $Z_{A22}$ each independently represents single bond, —CH$_2$CH$_2$—, —CF$_2$CF$_2$—, —CO—O—, —O—CO—, —O—CO—O—, —CH=CH—, —CF=CF—, —CH$_2$O— or —OCH$_2$—;

$L_{A11}$, $L_{A12}$, $L_{A13}$, $L_{A21}$ and $L_{A22}$ each independently represents —H, C$_{1-3}$ alkyl or halogen;

$X_{A1}$ and $X_{A2}$ each independently represents halogen, C$_{1-5}$ linear or branched halogenated alkyl or halogenated alkoxy, or C$_{2-5}$ linear or branched halogenated alkenyl or halogenated alkenoxy;

$n_{A11}$ represents 0, 1, 2 or 3, wherein when $n_{A11}$=2 or 3, ring

can be same or different, and $Z_{A11}$ can be same or different; and $n_{A12}$ represents 1 or 2, wherein when $n_{A12}$=2, ring

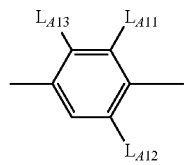

can be same or different;

$n_{A2}$ represents 1, 2 or 3, wherein when $n_{A2}$=2 or 3, ring

can be same or different, and $Z_{A21}$ can be same or different; and when $n_{A2}$=2, compounds of general formula A-2 do not comprise quaterphenyl structure.

In some embodiments of the present invention, the compound of general formula A-1 is selected from a group consisting of the following compounds:

A-1-1

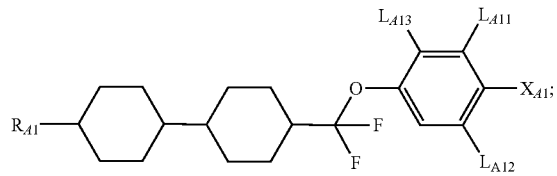

-continued
A-1-2
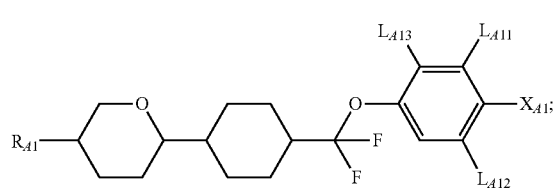
A-1-3
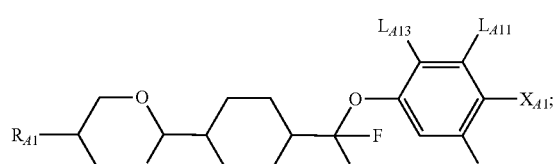
A-1-4
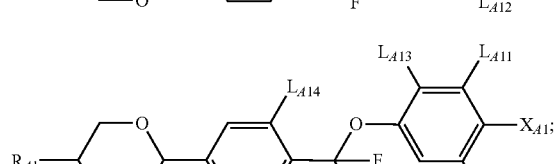
A-1-5
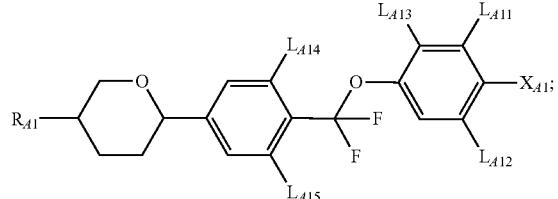
A-1-6
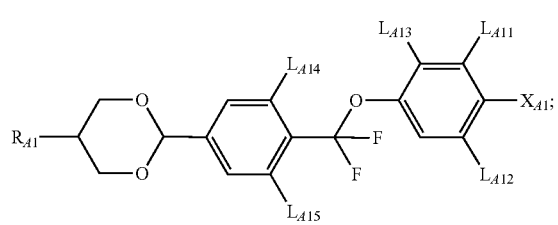
A-1-7
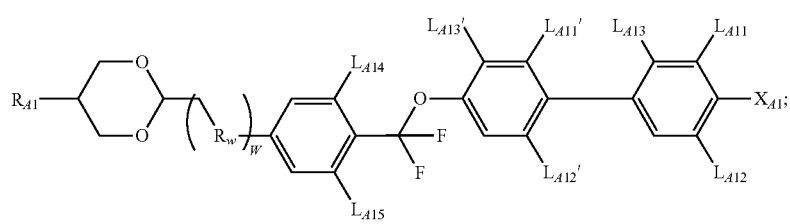
A-1-8
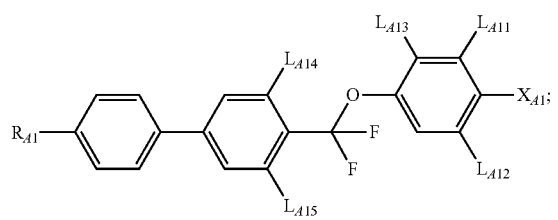
A-1-9
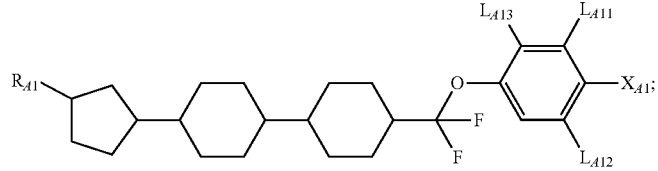
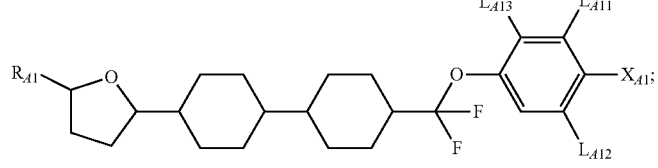

-continued
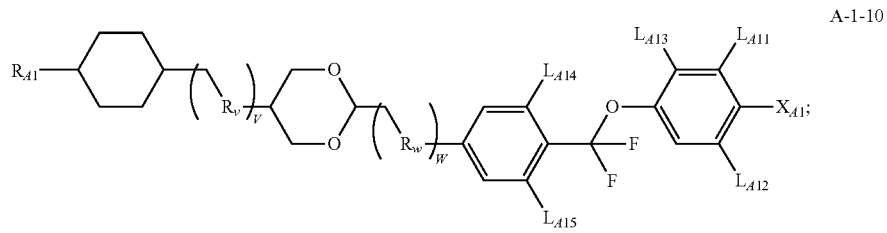
A-1-10
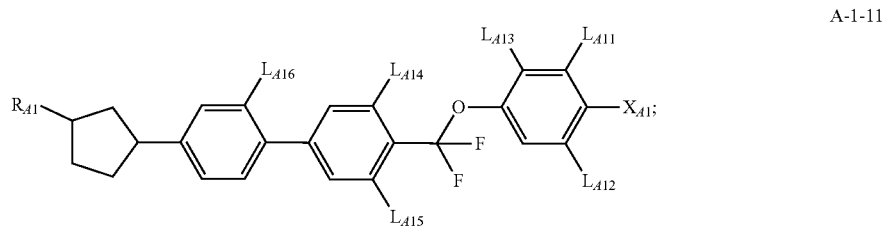
A-1-11
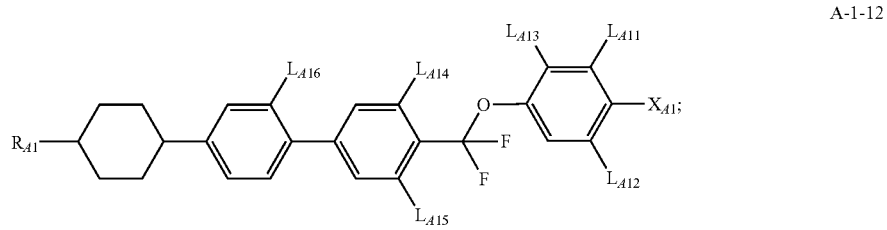
A-1-12
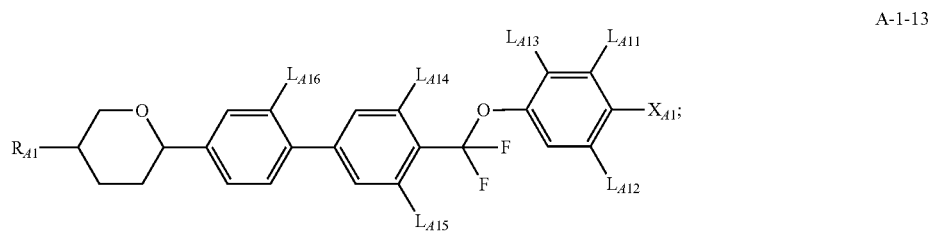
A-1-13
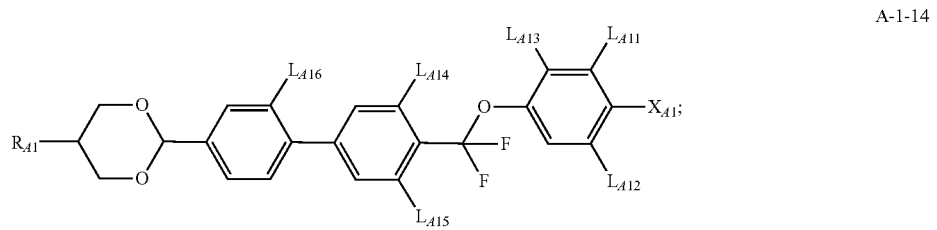
A-1-14
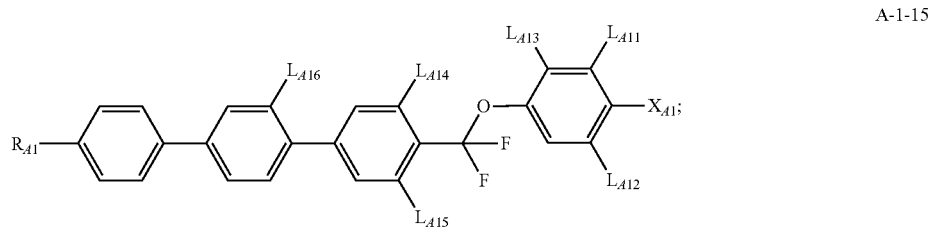
A-1-15
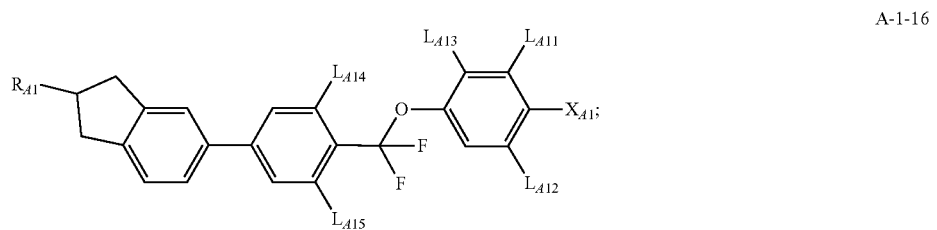
A-1-16

A-1-17

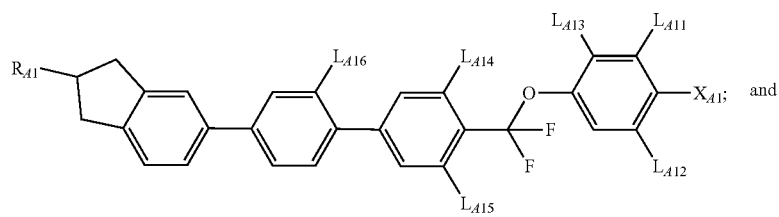

and

A-1-18

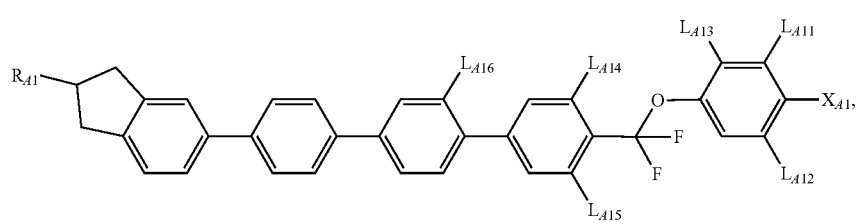

in which, $R_{A1}$ represents $C_{1-8}$ linear or branched alkyl,

wherein one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H in the $C_{1-8}$ linear or branched alkyl can each be independently substituted —F or —Cl;

$R_v$ and $R_w$ each independently represents —$CH_2$— or —O—;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$;

$X_{A1}$ represents —F, —$CF_3$ or —$OCF_3$; and v and w each independently represents 0 or 1.

The lower limit of the weight percentage of the compound of general formula A-1 is 0%, 1%, 2%, 4%, 6%, 8%, 10%, 12%, 14%, 16%, 18% or 20%, relative to the total weight of the liquid crystal composition of the present invention; and the upper limit of the weight percentage of the compound of general formula A-1 is 50%, 45%, 40%, 38%, 35%, 30%, 28%, 27%, 26% or 25%, relative to the total weight of the liquid crystal composition of the present invention.

In some embodiments of the present invention, the compound of general formula A-1 provides 0-50 wt. % of the total weight of the liquid crystal composition.

It is preferred that the lower limit and the upper limit of the content of the compound of general Formula A-1 are slightly lower when it is desired to maintain the liquid crystal composition of the present invention with a lower viscosity and a shorter response time. Further, it is preferred that the lower limit and the upper limit of the content of the compound of general Formula A-1 are slightly lower when it is desired to maintain the liquid crystal composition of the present invention with a higher clearing point and a good temperature stability. In addition, it is preferred that the lower limit and the upper limit of the content of the compound of general Formula A-1 are slightly higher in order to maintain the driving voltage lower and make the absolute value of the dielectric anisotropy larger.

In some embodiments of the present invention, the compound of general formula A-2 is selected from a group consisting of the following compounds:

A-2-1

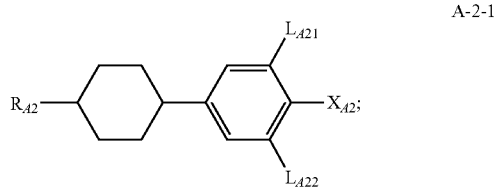

A-2-2

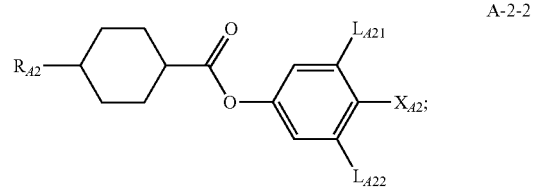

A-2-3

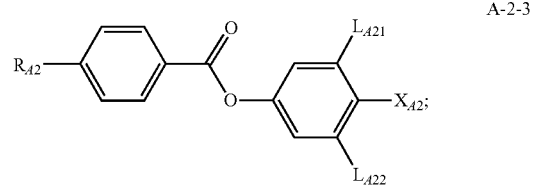

A-2-4

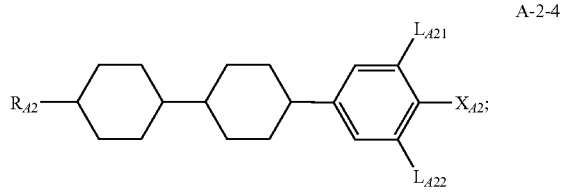

A-2-5

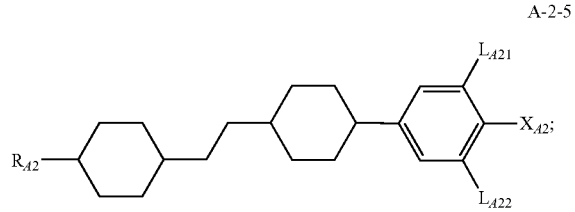

-continued

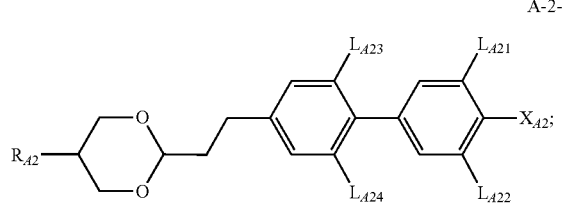
A-2-6

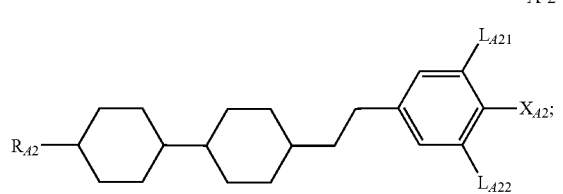
A-2-7

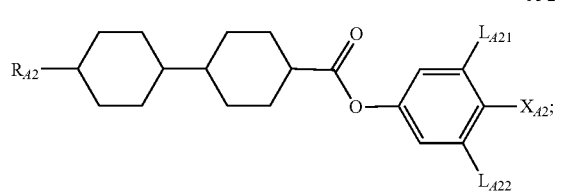
A-2-8

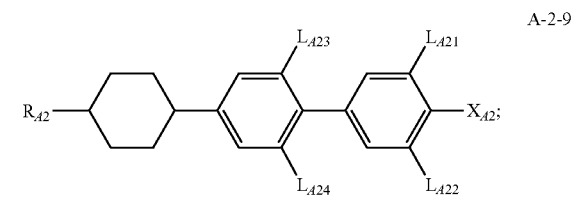
A-2-9

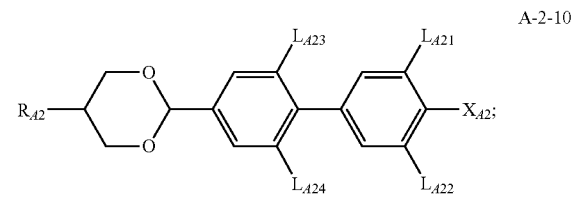
A-2-10

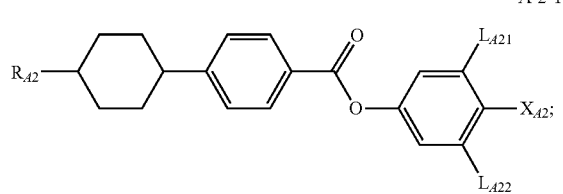
A-2-11

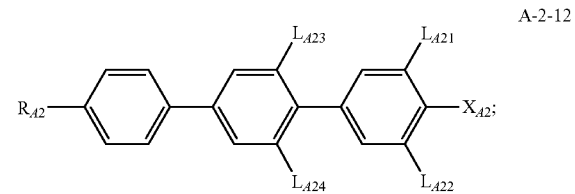
A-2-12

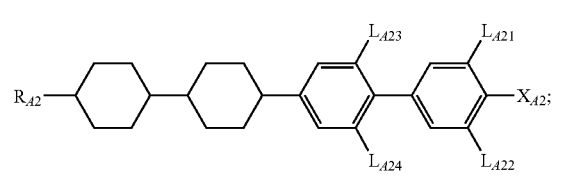
A-2-13

-continued

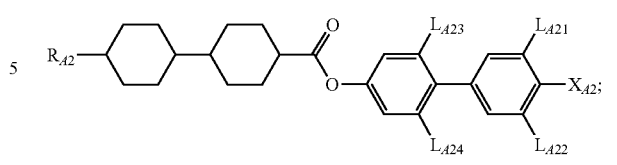
A-2-14

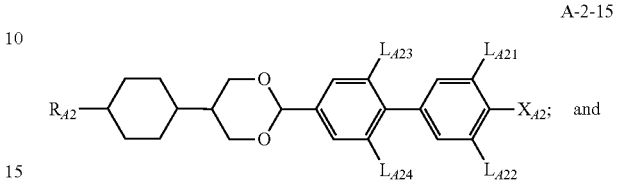
A-2-15

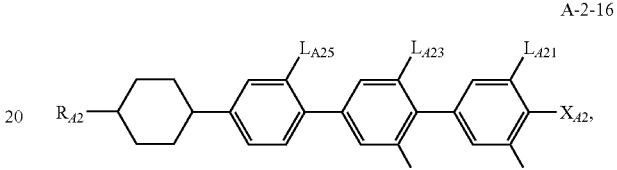
A-2-16 in which, $R_{A2}$ represents $C_{1-8}$ linear or branched alkyl, wherein one or more nonadjacent —$CH_2$— in the $C_{1-8}$ linear or branched alkyl can each be independently replaced by —CH=CH—, —C≡C—, —O—, —CO—, —CO—O— or —O—CO—, and one or more —H in these groups can each be independently substituted by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH=CF_2$.

The lower limit of the weight percentage of the compound of general formula A-2 is 0%, 0.5%, 1%, 2%, 4%, 6%, 8%, 10%, 12%, 14%, 15%, 16%, 17%, 18% or 20%, relative to the total weight of the liquid crystal composition of the present invention; and the upper limit of the weight percentage of the compound of general formula A-2 is 60%, 55%, 50%, 45%, 40%, 35%, 30%, 28%, 27%, 26% or 25%, relative to the total weight of the liquid crystal composition of the present invention.

In some embodiments of the present invention, the compound of general formula A-2 provides 0-60 wt. % of the total weight of the liquid crystal composition.

It is preferred that the lower limit and the upper limit of the content of the compound of general Formula A-2 are slightly lower when it is desired to maintain the liquid crystal composition of the present invention with a lower viscosity and a shorter response time. Further, it is preferred that the lower limit and the upper limit of the content of the compound of general Formula A-2 are slightly lower when it is desired to maintain the liquid crystal composition of the present invention with a higher clearing point and a good temperature stability. In addition, it is preferred that the lower limit and the upper limit of the content of the compound of general Formula A-2 are slightly higher in order to maintain the driving voltage lower and make the absolute value of the dielectric anisotropy larger.

In addition to the above compounds, the liquid crystal composition of the present invention may also contain normal nematic liquid crystal compound, smectic liquid crystal compound, cholesteric liquid crystal compound, antioxidant, ultraviolet absorber, infrared absorber, polymerizable monomer or light stabilizer, etc.

Dopants which can be preferably added to the liquid crystal composition according to the present invention are shown below.
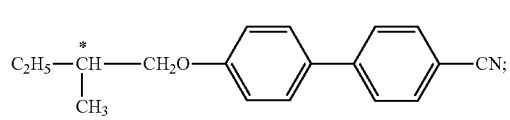
C 15
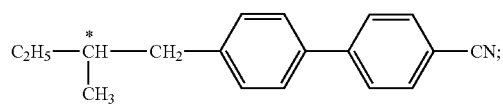
CB 15
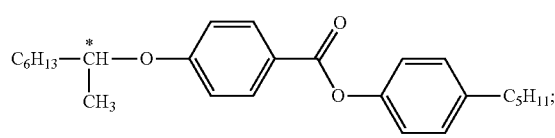
CM 21
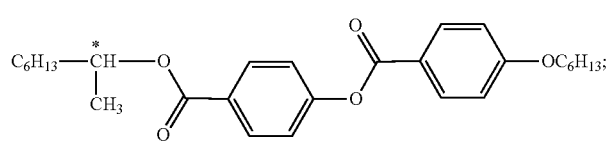
R/S-811
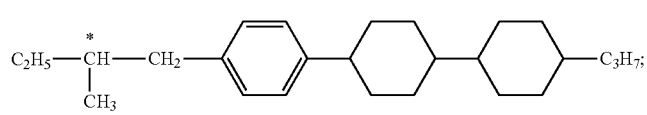
CM 44
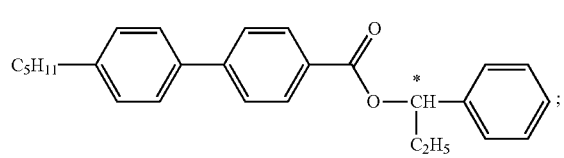
CM 45
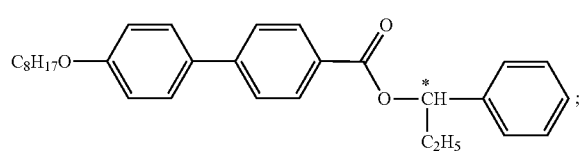
CM 47
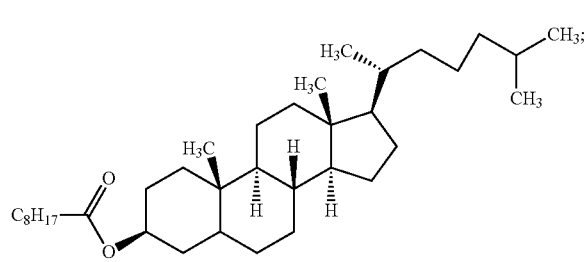
CN
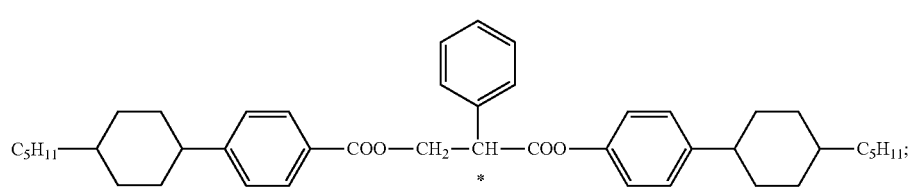
R/S-1011

-continued

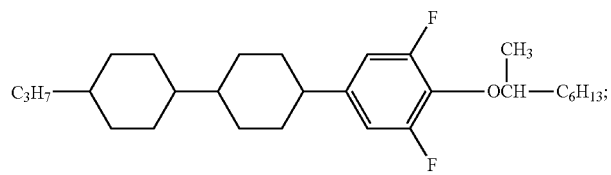
R/S-2011

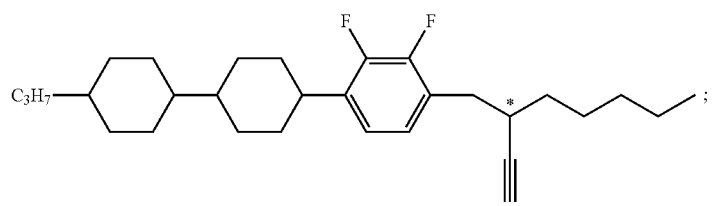
R/S-3011

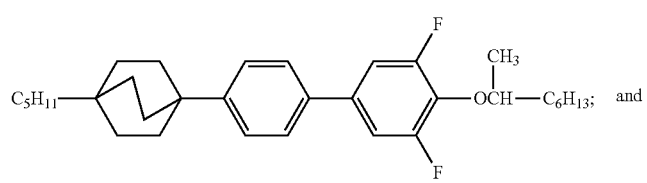
R/S-4011

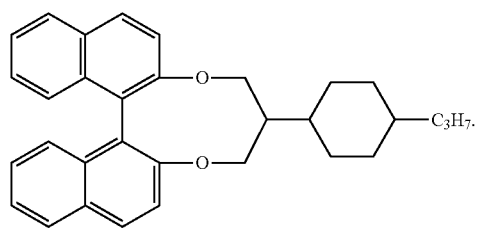
R/S-5011

In some embodiments of the present invention, the dopants provide 0-5 wt. % of the total weight of the liquid crystal composition; preferably, the dopants provide 0.01-1 wt. % of the total weight of the liquid crystal composition.

Further, additives used in the liquid crystal composition of the present invention, such as antioxidant, light stabilizer and the like, are preferably selected from the following substances:

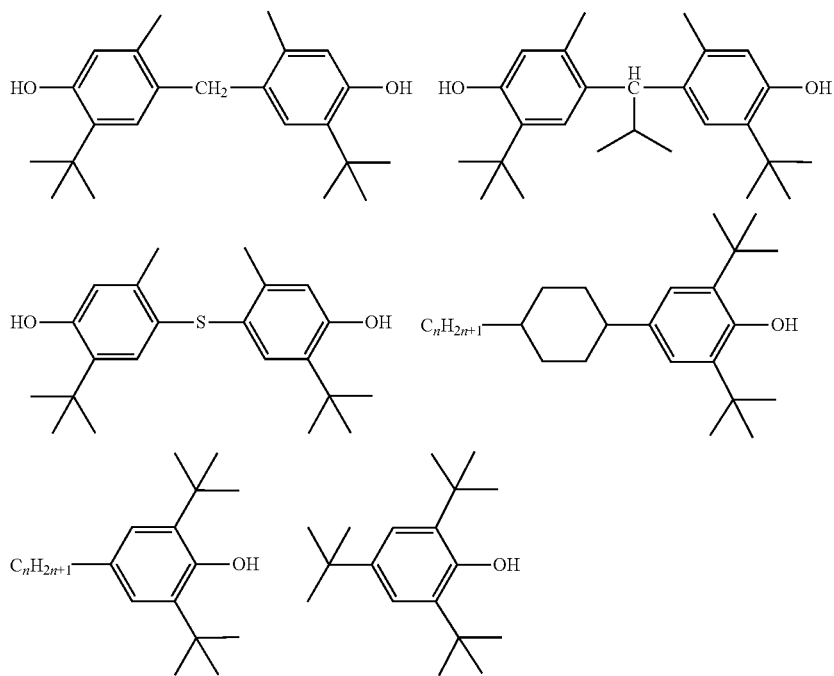

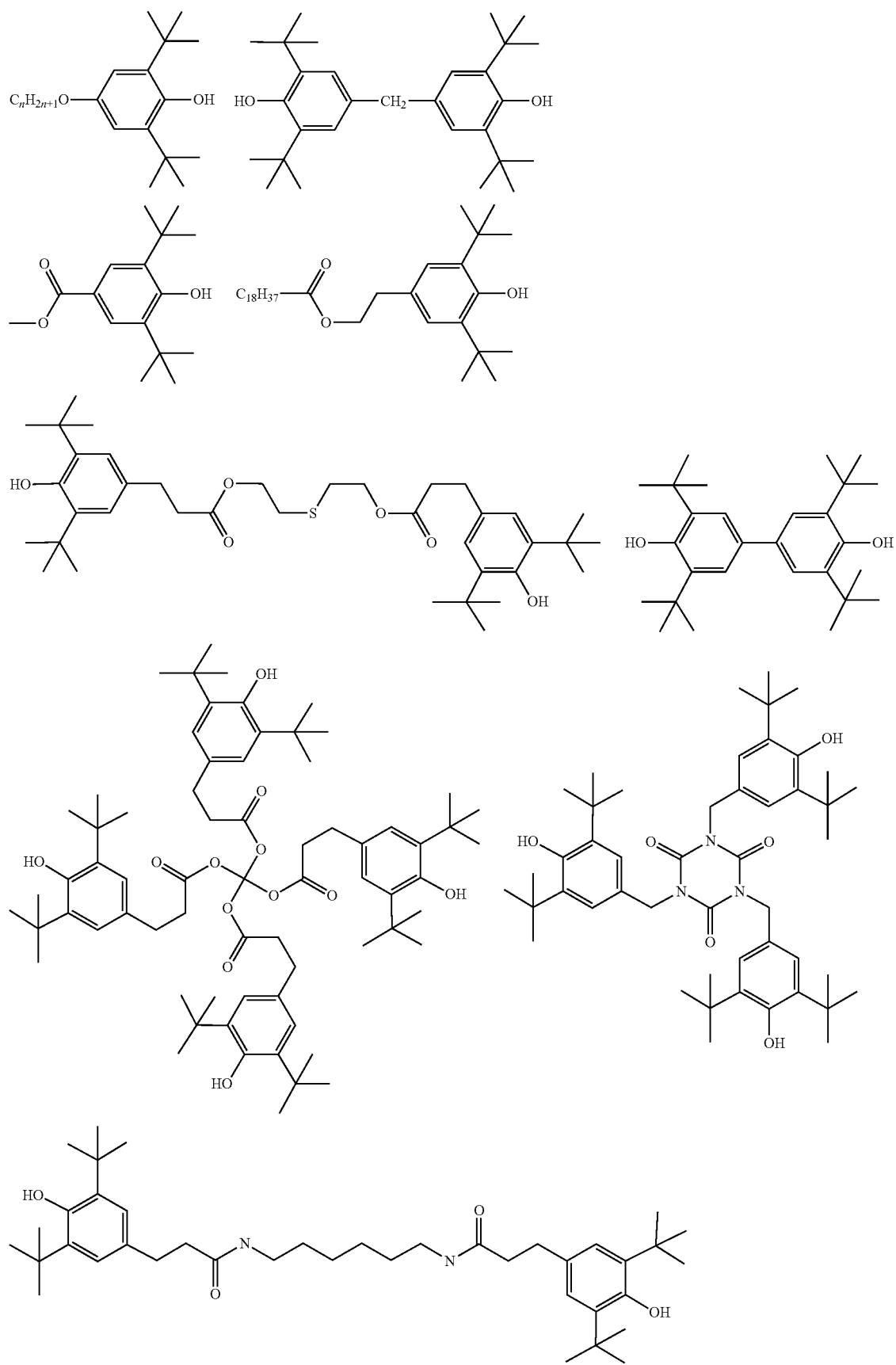

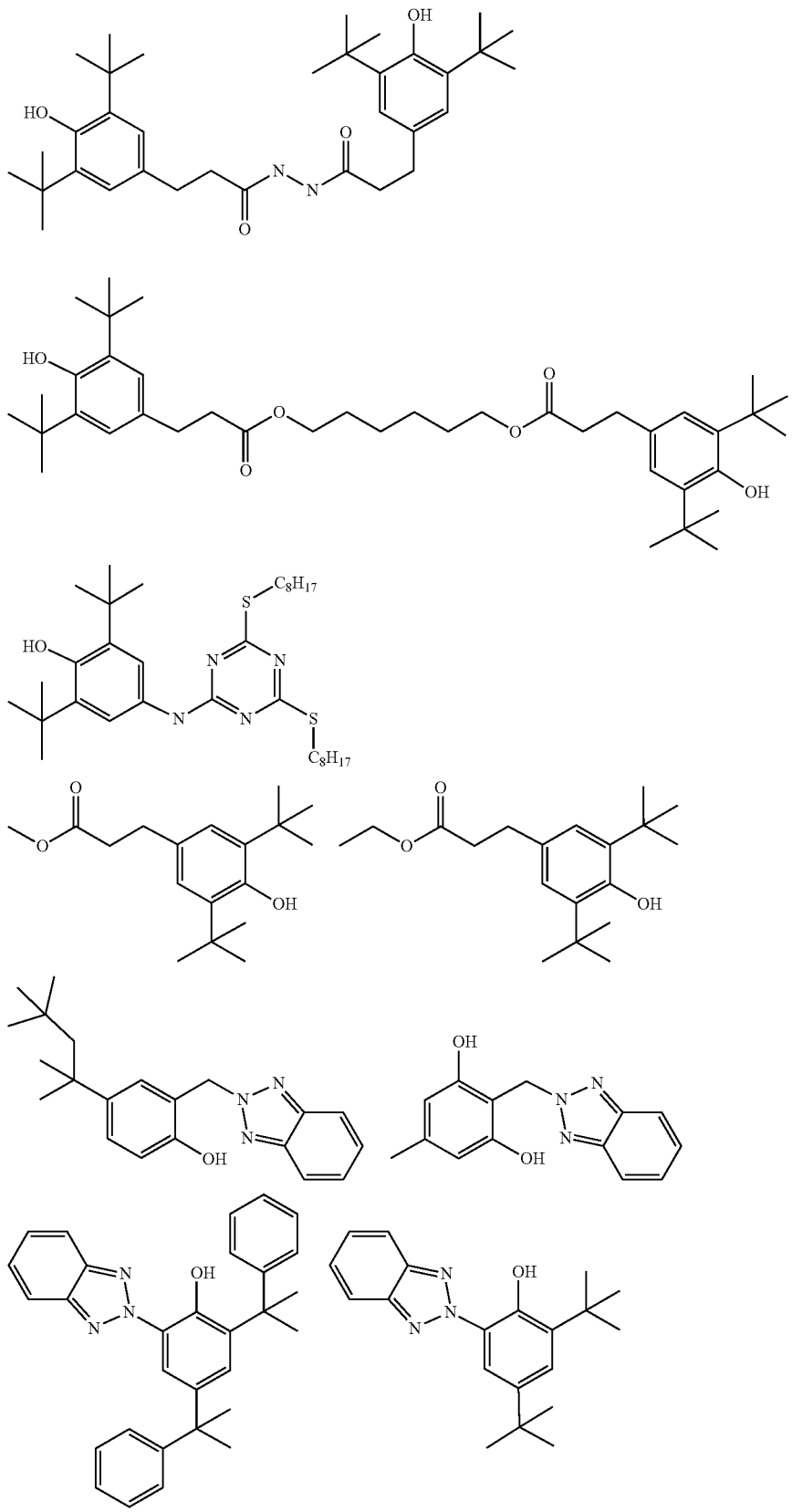

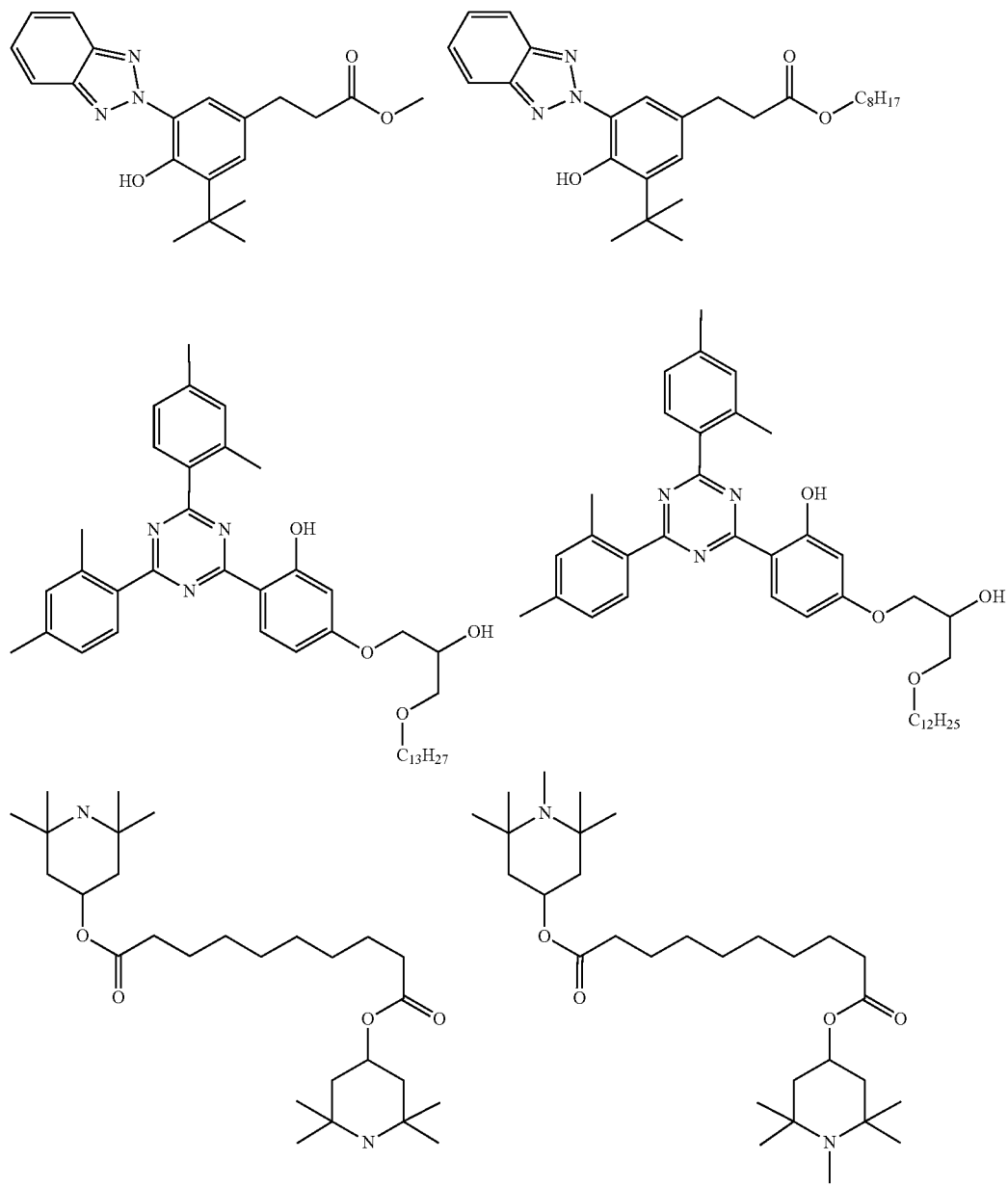
in which, n represents a positive integer of 1-12.
Preferably, the light stabilizer is selected from a group consisting of the light stabilizers as shown below.
-continued
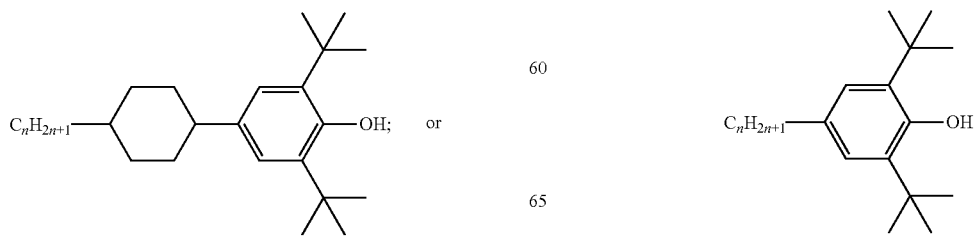

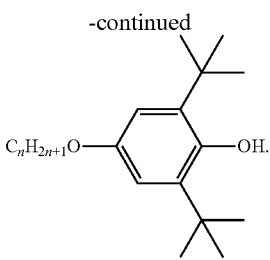

In some embodiments of the present invention, the light stabilizers provide 0-5 wt. % of the total weight of the liquid crystal composition; preferably, the light stabilizers provide 0.01-1 wt. % of the total weight of the liquid crystal composition; and further preferably, the light stabilizers provide 0.01-0.1 wt. % of the total weight of the liquid crystal composition.

In still another aspect, the present invention provides a liquid crystal display device comprising the above liquid crystal composition.

In some embodiments of the present invention, the liquid crystal display device is particularly suitable in VA, IPS or FFS display modes.

Beneficial Effects

Compared with the prior art, the liquid crystal composition of the present has a smaller voltage change rate at high and low temperatures and a shorter low temperature response time, while maintaining an appropriate optical anisotropy, an appropriate clearing point, an appropriate absolute value of dielectric anisotropy, such that the liquid crystal display device comprising the liquid crystal composition has a better display and a faster response speed.

DETAILED DESCRIPTION OF THE INVENTION

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 1:

TABLE 1

Codes of the group structures of liquid crystal compounds

| Unit structure of group | Code | Name of group |
|---|---|---|
| (cyclohexane) | C | 1,4-cyclohexylidene |
| (benzene) | P | 1,4-phenylene |
| (2-fluorobenzene) | G | 2-fluoro-1,4-phenylene |
| (2,6-difluorobenzene) | U | 2,6-difluoro-1,4-phenylene |
| (2,3-difluorobenzene) | W | 2,3-difluoro-1,4-phenylene |
| (cyclopentyl) | C(5) | cyclopentyl |
| (4,6-difluoro-dibenzofuran) | B(O) | 4,6-difluoro-dibenzo[b,d]furan-3,7-diyl |
| (4,6-difluoro-dibenzothiophene) | B(S) | 4,6-difluoro-dibenzo[b,d]thiophene-3,7-diyl |
| (naphthyl) | Na | naphthyl |
| —CH$_2$O— | 1O | methyleneoxy |
| —CH$_2$CH$_2$— | 2 | ethyl bridge bond |
| —CO— | CO | carbonyl |
| —F | F | fluorine substituent |
| —O— | O | oxygen substituent |
| —CH=CH— or —CH=CH$_2$ | V | ethenyl |
| —C$_n$H$_{2n+1}$ | n (n represents an integer of 1-12) | alkyl |

Take the compound with following structural formula as an example:

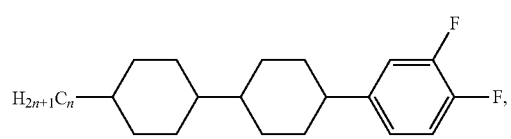

represented by the codes listed in Table 1, this structural formula can be expressed as nCCGF, in which, n in the code represents the number of the carbon atoms of the alkyl on the left, for example, n is "3", meaning that the alkyl is —$C_3H_7$; C in the code represents 1,4-cyclohexylidene, G represents 2-fluoro-1,4-phenylene, and F represents fluoro substituent.

The abbreviated codes of the test items in the following Examples are as follows:

Cp (° C.) clearing point (nematic-isotropy phases transition temperature)
Δn optical anisotropy (589 nm, 25° C.)
Δε dielectric anisotropy (1 KHz, 25° C.)
DV/DT voltage change rate at high and low temperatures (%)
$\tau_{(-20° C.)}$ low temperature response time (ms)
in which,
Cp: tested and obtained through melting point apparatus;
Δn: tested and obtained by using Abbe refractometer under sodium lamp (589 nm) light source at 25° C.;
Δε: $\Delta\varepsilon = \varepsilon_{//} - \varepsilon_{\perp}$, in which, $\varepsilon_{//}$ is the dielectric constant parallel to the molecular axis, $\varepsilon_{\perp}$ is the dielectric constant perpendicular to the molecular axis, with the test conditions: 25° C., 1 KHz, VA type test cell with a cell gap of 6 μm;
DV/DT: tested by using DMS505 tester; with the test conditions: test frequency: 60 Hz, test waveform: square, high temperature 60° C., room temperature 20° C.;
$\tau_{(-20° C.)}$: tested and obtained by using DMS505 tester at −20° C.; with the test conditions: IPS type test cell with a cell gap of 3.5 driving voltage 5.5 V.

The ingredients used in the following Examples can be synthesized by well-known methods or obtained by commercial means. These synthetic techniques are routine, and the test results show that the liquid crystal compounds thus prepared meet the criteria for the electronic compounds.

The liquid crystal compositions are prepared according to the formulations of the liquid crystal compositions specified in the following Examples. The preparation of the liquid crystal compositions is proceeded according to the conventional methods in the art, such as heating, ultrasonic wave, or suspension.

The liquid crystal composition specified in the following Examples are prepared and studied. The formulas of the liquid crystal compositions and their test results for the performance are shown below.

Comparative Example 1

The liquid crystal composition of Comparative Example 1 is prepared according to each compound and weight percentage listed in Table 2 and is tested by filling the same between two substrates of a liquid crystal display device.

TABLE 2

Formulation and test performances of liquid crystal composition

| Code of component | Weight percent | Code of structure | Test results for the performance parameters | |
|---|---|---|---|---|
| 3CWO2 | 14.5 | N-2 | Δn | 0.102 |
| 3CCWO2 | 13 | N-5 | Cp | 89 |
| 2CCWO2 | 8.5 | N-5 | Δε | −3.1 |
| 5CWO2 | 8 | N-2 | DV/DT | 21 |
| 2PWP3 | 6 | II-3 | $\tau_{(-20°C.)}$ | 460 |
| 3CCV | 21.5 | M-1 | | |
| 3CCV1 | 8 | M-1 | | |
| 1PP2V | 2 | M-6 | | |
| 3CPWO2 | 5 | N-11 | | |

TABLE 2-continued

Formulation and test performances of liquid crystal composition

| Code of component | Weight percent | Code of structure | Test results for the performance parameters |
|---|---|---|---|
| 3CCWO3 | 4.5 | N-5 | |
| VCCP1 | 2 | M-12 | |
| 3CPP2 | 3 | M-16 | |
| 3CCP2 | 3 | M-12 | |
| 3CPO2 | 1 | M-2 | |
| Total | 100 | | |

Example 1

The liquid crystal composition of Example 1 is prepared according to each compound and weight percentage listed in Table 3 and is tested by filling the same between two substrates of a liquid crystal display device.

TABLE 3

Formulation and test performances of liquid crystal composition

| Code of component | Weight percent | Code of structure | Test results for the performance parameters | |
|---|---|---|---|---|
| 3CWO2 | 14.5 | N-2 | Δn | 0.104 |
| 3CCWO2 | 13 | N-5 | Cp | 89 |
| 2CCWO2 | 8.5 | N-5 | Δε | −3.6 |
| 5CWO2 | 8 | N-2 | DV/DT | 17 |
| 2PWP3 | 6 | II-3 | $\tau_{(-20°C.)}$ | 390 |
| 3CCV | 21.5 | M-1 | | |
| 3CCV1 | 8 | M-1 | | |
| 1PP2V | 2 | M-6 | | |
| C(5)1OB(O)O5 | 4 | I-1 | | |
| 3CCWO3 | 5.5 | N-5 | | |
| VCCP1 | 2 | M-12 | | |
| 3CPP2 | 3 | M-16 | | |
| 2CPP2 | 3 | M-16 | | |
| 3CPO2 | 1 | M-2 | | |
| Total | 100 | | | |

Example 2

The liquid crystal composition of Example 2 is prepared according to each compound and weight percentage listed in Table 4 and is tested by filling the same between two substrates of a liquid crystal display device.

TABLE 4

Formulation and test performances of liquid crystal composition

| Code of component | Weight percent | Code of structure | Test results for the performance parameters | |
|---|---|---|---|---|
| 3CWO2 | 14.5 | N-2 | Δn | 0.104 |
| 3CCWO2 | 10 | N-5 | Cp | 87 |
| 2CCWO2 | 8.5 | N-5 | Δε | −4 |
| 5CWO2 | 8 | N-2 | DV/DT | 14 |
| 2PWP3 | 6 | II-3 | $\tau_{(-20°C.)}$ | 360 |
| 3CCV | 21.5 | M-1 | | |
| 3CCV1 | 8 | M-1 | | |
| 1PP2V | 2 | M-6 | | |
| 3OB(O)O4 | 5 | I-1 | | |
| 4OB(CO)5 | 3 | I-1 | | |
| 3CCWO3 | 4.5 | N-5 | | |

TABLE 4-continued

Formulation and test performances of liquid crystal composition

| Code of component | Weight percent | Code of structure | Test results for the performance parameters | |
|---|---|---|---|---|
| VCCP1 | 2 | M-12 | | |
| 3CPP2 | 3 | M-16 | | |
| 3CGPC3 | 2 | M-25 | | |
| 3PPGGF | 2 | III-2 | | |
| Total | 100 | | | |

Example 3

The liquid crystal composition of Example 3 is prepared according to each compound and weight percentage listed in Table 5 and is tested by filling the same between two substrates of a liquid crystal display device.

TABLE 5

Formulation and test performances of liquid crystal composition

| Code of component | Weight percent | Code of structure | Test results for the performance parameters | |
|---|---|---|---|---|
| 3CWO2 | 14.5 | N-2 | $\Delta n$ | 0.11 |
| 3CCWO2 | 8 | N-5 | Cp | 89 |
| 2CCWO2 | 6 | N-5 | $\Delta \varepsilon$ | −4.9 |
| 5CWO2 | 8 | N-2 | DV/DT | 12 |
| 2PWP3 | 6 | II-3 | $\tau_{(-20°C.)}$ | 340 |
| 3CCV | 21.5 | M-1 | | |
| 3CCV1 | 8 | M-1 | | |
| 1PP2V | 2 | M-6 | | |
| 3OB(S)O3 | 8 | I-1 | | |
| C(5)B(O)O6 | 8.5 | I-1 | | |
| VCCP1 | 2 | M-12 | | |
| 3CPP2 | 1.5 | M-16 | | |
| 3CPPC3 | 2.5 | M-23 | | |
| 5PGP(Na) | 1 | III-1 | | |
| 3PPGUF | 2.5 | III-2 | | |
| Total | 100 | | | |

It can be seen from the comparison between Comparative Example 1 and Example 1 that the liquid crystal composition of the present has a smaller voltage change rate at high and low temperatures and a shorter low temperature response time, while maintaining an appropriate optical anisotropy, an appropriate clearing point, an appropriate absolute value of dielectric anisotropy.

Comparative Example 2

The liquid crystal composition of Comparative Example 2 is prepared according to each compound and weight percentage listed in Table 6 and is tested by filling the same between two substrates of a liquid crystal display device.

TABLE 6

Formulation and test performances of liquid crystal composition

| Code of component | Weight percent | Code of structure | Test results for the performance parameters | |
|---|---|---|---|---|
| 3CWO2 | 14.5 | N-2 | $\Delta n$ | 0.103 |
| 3CCWO2 | 13 | N-5 | Cp | 88 |
| 2CCWO2 | 9.5 | N-5 | $\Delta \varepsilon$ | −3.6 |
| 5CWO2 | 8 | N-2 | DV/DT | 22 |
| 3OB(O)O4 | 5 | I-1 | $\tau_{(-20°C.)}$ | 410 |
| 3CCV | 21.5 | M-1 | | |
| 3CCV1 | 8 | M-1 | | |
| 1PP2V | 2 | M-6 | | |
| 3CPWO2 | 5 | N-11 | | |
| 3CCWO3 | 4.5 | N-5 | | |
| VCCP1 | 2 | M-12 | | |
| 3CPP2 | 3 | M-16 | | |
| 3CCP2 | 3 | M-12 | | |
| 3CPO2 | 1 | M-2 | | |
| Total | 100 | | | |

Example 4

The liquid crystal composition of Example 4 is prepared according to each compound and weight percentage listed in Table 7 and is tested by filling the same between two substrates of a liquid crystal display device.

TABLE 7

Formulation and test performances of liquid crystal composition

| Code of component | Weight percent | Code of structure | Test results for the performance parameters | |
|---|---|---|---|---|
| 3CWO2 | 14.5 | N-2 | $\Delta n$ | 0.104 |
| 3CCWO2 | 13 | N-5 | Cp | 86 |
| 2CCWO2 | 9.5 | N-5 | $\Delta \varepsilon$ | −3.5 |
| 5CWO2 | 8 | N-2 | DV/DT | 16 |
| 3OB(O)O4 | 6 | I-1 | $\tau_{(-20°C.)}$ | 380 |
| 3CCV | 21.5 | M-1 | | |
| 3CCV1 | 8 | M-1 | | |
| 1PP2V | 2 | M-6 | | |
| 3PWP3 | 4 | II-3 | | |
| 3CCWO3 | 4.5 | N-5 | | |
| VCCP1 | 2 | M-12 | | |
| 3CPP2 | 3 | M-16 | | |
| 3CCP2 | 1 | M-12 | | |
| 3CPO2 | 1 | M-2 | | |
| 3GGPPF | 2 | III-2 | | |
| Total | 100 | | | |

Example 5

The liquid crystal composition of Example 5 is prepared according to each compound and weight percentage listed in Table 8 and is tested by filling the same between two substrates of a liquid crystal display device.

TABLE 8

Formulation and test performances of liquid crystal composition

| Code of component | Weight percent | Code of structure | Test results for the performance parameters | |
|---|---|---|---|---|
| 3CWO2 | 12.5 | N-2 | $\Delta n$ | 0.106 |
| 3CCWO2 | 9 | N-5 | Cp | 87 |
| 2CCWO2 | 8 | N-5 | $\Delta \varepsilon$ | −3.6 |

TABLE 8-continued

Formulation and test performances of liquid crystal composition

| Code of component | Weight percent | Code of structure | Test results for the performance parameters | |
|---|---|---|---|---|
| 5CWO2 | 8 | N-2 | DV/DT | 13 |
| 3OB(O)O4 | 5 | I-1 | $\tau_{(-20°C.)}$ | 355 |
| 3CCV | 21.5 | M-1 | | |
| 3CCV1 | 8 | M-1 | | |
| 1PP2V | 2 | M-6 | | |
| 3PWP3 | 7 | II-3 | | |
| 4PPWO2 | 8.5 | II-4 | | |
| VCCP1 | 2 | M-12 | | |
| 3CPP2 | 1 | M-16 | | |
| 3CCP2 | 1 | M-12 | | |
| 3CPO2 | 1 | M-2 | | |
| 3GGPPF | 3 | III-2 | | |
| C(5)PPGUF | 2.5 | III-2 | | |
| Total | 100 | | | |

Example 6

The liquid crystal composition of Example 6 is prepared according to each compound and weight percentage listed in Table 9 and is tested by filling the same between two substrates of a liquid crystal display device.

TABLE 9

Formulation and test performances of liquid crystal composition

| Code of component | Weight percent | Code of structure | Test results for the performance parameters | |
|---|---|---|---|---|
| 3CWO2 | 8.5 | N-2 | $\Delta n$ | 0.115 |
| 3CCWO2 | 4 | N-5 | Cp | 88 |
| 2CCWO2 | 4 | N-5 | $\Delta\varepsilon$ | −3.9 |
| 5CWO2 | 7 | N-2 | DV/DT | 11 |
| 3OB(O)O4 | 5 | I-1 | $\tau_{(-20°C.)}$ | 350 |
| C(5)1OB(S)O4 | 5 | I-1 | | |
| 3CCV | 21.5 | M-1 | | |
| 3CCV1 | 8 | M-1 | | |
| 1PP2V | 2 | M-6 | | |
| 3PWP3 | 8 | II-3 | | |
| 4PPWO2 | 7.5 | II-4 | | |
| 3PWWO3 | 7.5 | II-5 | | |
| 3OPPWO2 | 3 | II-4 | | |
| VCCP1 | 2 | M-12 | | |
| 3CPP2 | 1 | M-16 | | |
| 3CCP2 | 1 | M-12 | | |
| 3CPO2 | 1 | M-2 | | |
| 3GGPPF | 2 | III-2 | | |
| C(5)PPGUF | 2 | III-2 | | |
| Total | 100 | | | |

It can be seen from the comparison between Comparative Example 2 and Example 4 that the liquid crystal composition of the present has a smaller voltage change rate at high and low temperatures and a shorter low temperature response time, while maintaining an appropriate optical anisotropy, an appropriate clearing point, an appropriate absolute value of dielectric anisotropy.

In conclusion, the liquid crystal composition of the present has a smaller voltage change rate at high and low temperatures and a shorter low temperature response time, while maintaining an appropriate optical anisotropy, an appropriate clearing point, an appropriate absolute value of dielectric anisotropy, such that the liquid crystal display device comprising the liquid crystal composition has a better display and a faster response speed.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

What is claimed is:

1. A liquid crystal composition, wherein the liquid crystal composition comprises:

at least one compound of general formula I

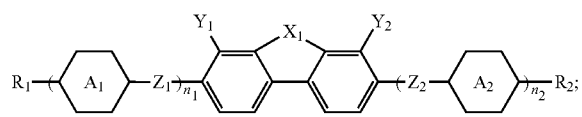

at least one compound of general formulas II-1, II-2, II-5, II-6, II-7, and II-11 selected from the group consisting of:

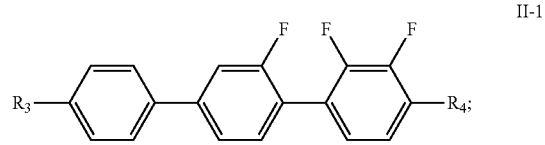

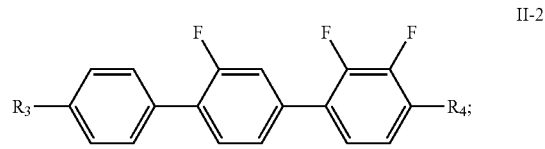

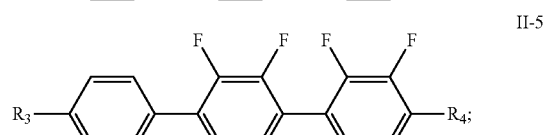

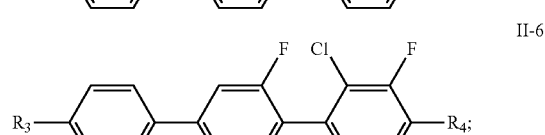

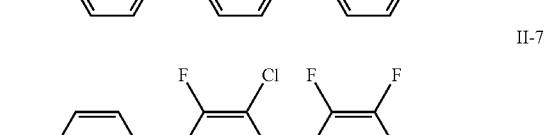 and

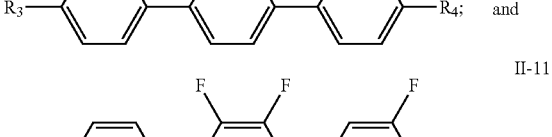

at least one compound of general formula III-1

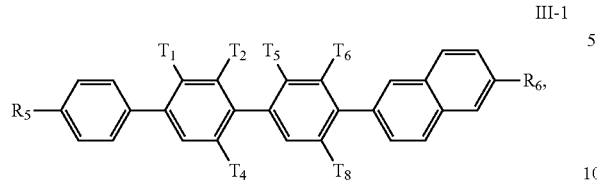

in which, $R_1$ represents —H;

$R_2$ represents —H, halogen, $C_{1-12}$ linear alkyl or $C_{3-12}$ branched alkyl,

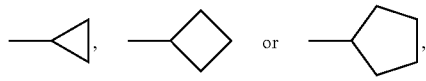

wherein one or more nonadjacent —CH$_2$— in the $C_{1-12}$ linear alkyl or $C_{3-12}$ branched alkyl can each be independently replaced by —CH=CH—, —C≡C—, —O—, —CO—, —CO—O— or —O—CO—, and one or more —H in

can each be independently substituted by —F or —Cl;

$R_3$ and $R_4$ each independently represents $C_{1-12}$ linear alkyl or $C_{3-12}$ branched alkyl,

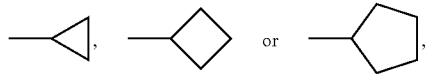

wherein one or more nonadjacent —CH$_2$— in the $C_{1-12}$ linear alkyl or $C_{3-12}$ branched alkyl can each be independently replaced by —CH=CH—, —C≡C—, —O—, —CO—, —CO—O— or —O—CO—;

ring

represents

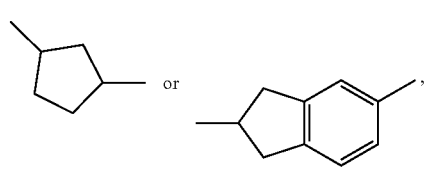

wherein one or more —CH$_2$— in

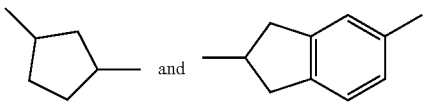

can be replaced by —O—, and one or more single bond in the rings can be replaced by double bond, wherein one or more —H on

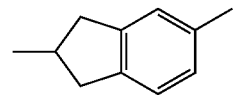

in the ring

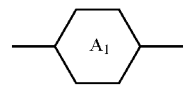

can each be independently substituted by —F, —Cl, —CN, —CH$_3$ or —OCH$_3$, and one or more —CH= in the ring

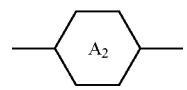

can be replaced by —N=;

ring

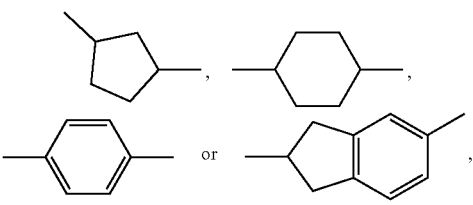

represents

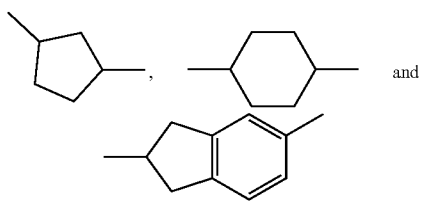

wherein one or more —CH$_2$— in and can be replaced by —O—, and one or more single bond in the rings can be replaced by double bond, wherein one or more —H on

[structures: phenyl and indanyl groups] and in the ring

[structure: A$_2$ cyclohexyl]

can each be independently substituted by —F, —Cl, —CN, —CH$_3$ or —OCH$_3$, and one or more —CH═ in the ring

[structure: A$_2$ cyclohexyl]

can be replaced by —N═;

X$_1$ represents —O—, —S—, —CO—, —CF$_2$—, —NH— or —NF—;

Y$_1$ and Y$_2$ each independently represents —H, halogen, C$_{1-3}$ halogenated or unhalogenated alkyl, or C$_{1-3}$ halogenated or unhalogenated alkoxy;

Z$_1$ represents —O—, —S—, —CO—O—, —O—CO—, —OCH$_2$—, —CH═CH—, —C≡C—, —CH$_2$CH$_2$—, —CF$_2$CF$_2$—, —(CH$_2$)$_4$—, —CF$_2$O— or —OCF$_2$—, and Z$_2$ represents single bond, —O—, —S—, —CO—O—, —O—CO—, —CH$_2$O—, —OCH$_2$—, —CH═CH—, —C≡C—, —CH$_2$CH$_2$—, —CF$_2$CF$_2$—, —(CH$_2$)$_4$—, —CF$_2$O— or —OCF$_2$—;

T$_1$, T$_2$, T$_4$, T$_5$, T$_6$, and T$_8$ each independently represents —H, —F, —Cl, —CN, —CH$_3$ or —OCH$_3$;

R$_5$ and R$_6$ each independently represents C$_{1-10}$ linear alkyl or C$_{3-10}$ branched alkyl,

[structures: cyclopropyl, cyclobutyl, cyclopentyl],

C$_{1-9}$ linear alkyl or C$_{3-9}$ branched alkoxy, or C$_{2-10}$ linear alkyl or C$_{3-10}$ branched alkenyl; and n$_1$ represents 1 or 2, n$_2$ represents 0, 1 or 2, wherein when n$_1$=2, ring

[structure: A$_1$ cyclohexyl]

can be same or different, and Z$_1$ can be same or different;

wherein when n$_2$=2, ring

[structure: A$_2$ cyclohexyl]

can be same or different, and Z$_2$ can be same or different.

2. The liquid crystal composition according to claim 1, wherein the compound of general formula I is selected from a group consisting of the following compounds:

[structure I-2]

[structure I-3] and

[structure I-4]

in which, ring

[structure: A$_1$' cyclohexyl]

represents

[structures: cyclopentyl or indanyl], wherein one or more —CH$_2$— in

[structures: cyclopentyl and indanyl] and can be replaced by —O—, and one or more single bond in the rings can be replaced by double bond, wherein one or more —H on

[structure: indanyl]

in the ring

can each be independently substituted by —F, —Cl, —CN, —CH₃ or —OCH₃, and one or more —CH= in the ring

can be replaced by —N=;
$Z_1'$ represents —O—, —S—, —CO—O—, —O—CO—, —OCH₂—, —CH=CH—, —C≡C—, —CH₂CH₂—, —CF₂CF₂—, —(CH₂)₄—, —CF₂O— or —OCF₂—; and
$X_1$ represents —O—, —S— or —CO—.

3. The liquid crystal composition according to claim 1, further comprising a compound selected from a group consisting

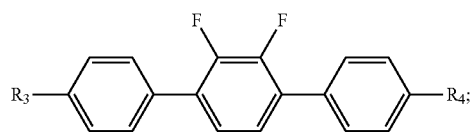
II-3

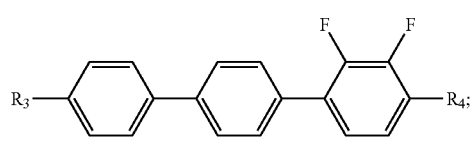
II-4

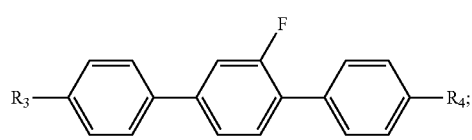
II-8

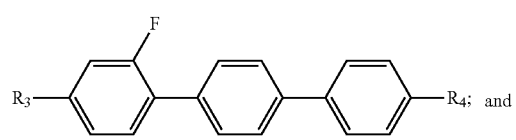
II-9

II-10 wherein $R_3$ and $R_4$ each independently represents $C_{1-12}$ linear alkyl or $C_{3-12}$ branched alkyl,

wherein one or more nonadjacent —CH₂— in the $C_{1-12}$ linear alkyl or $C_{3-12}$ branched alkyl can each be independently replaced by —CH=CH—, —C≡C—, —O—, —CO—, —CO—O— or —O—CO—.

4. The liquid crystal composition according to claim 1, wherein the compound of general formula I provides 0.1-40 wt. % of the total weight of the liquid crystal composition; and the compound of general formulas II-1, II-2, II-5, II-6, II-7, and II-11 provides 0.1-70 wt. % of the total weight of the liquid crystal composition.

5. The liquid crystal composition according to claim 1, wherein the liquid crystal composition further comprises at least one compound of general formula III-2:

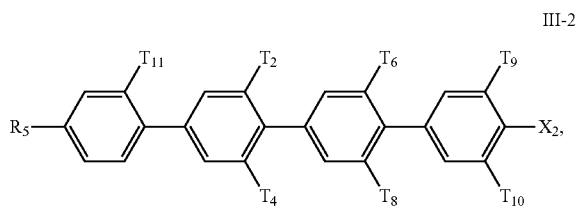
III-2 in which,
$T_9$, $T_{10}$ and $T_{11}$ each independently represents —H, —F, —Cl, —CN, —CH₃ or —OCH₃; and
$X_2$ represents —F, —CF₃, —OCF₃ or —CH₂CH₂CH=CF₂.

6. The liquid crystal composition according to claim 5, wherein the compounds of general formulas III-1 and III-2 provide 0.1-50 wt. % of the total weight of the liquid crystal composition.

7. The liquid crystal composition according to claim 1, wherein the liquid crystal composition further comprises at least one compound of general formula M:

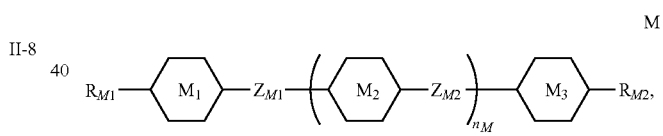
M in which,
$R_{M1}$ and $R_{M2}$ each independently represents $C_{1-12}$ linear alkyl or $C_{3-12}$ branched alkyl,

wherein one or more nonadjacent —CH₂— in the $C_{1-12}$ linear alkyl or $C_{3-12}$ branched alkyl can each be independently replaced by —CH=CH—, —C≡C—, —O—, —CO—, —CO—O— or —O—CO—;
ring

ring

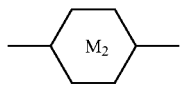

and ring

each independently represents

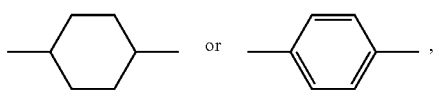

wherein one or more —CH$_2$— on

in the rings

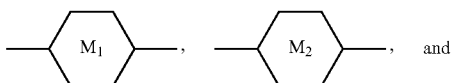

can be replaced by —O—, one or more single bond in the ring can be replaced by double bond, wherein at most one —H on

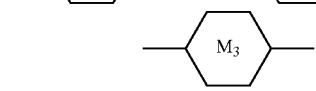

in the rings

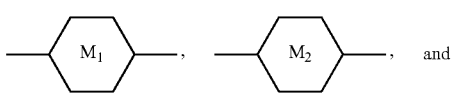

can be substituted by halogen;

$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and $n_M$ represents 0, 1 or 2, wherein when $n_M$=2, ring

can be same or different, $Z_{M2}$ can be same or different; and when $n_M$=1 or 2, at least one of ring

ring

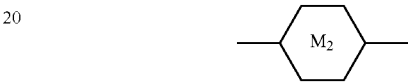

and ring

is non-aromatic ring.

8. The liquid crystal composition according to claim 1, wherein the liquid crystal composition further comprises at least one compound of general formula N:

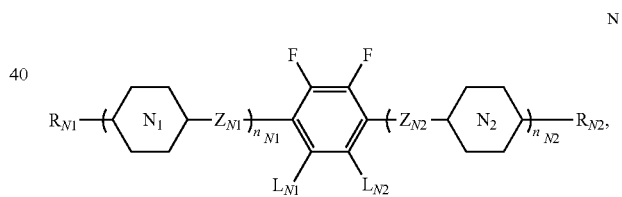

in which, $R_{N1}$ and $R_{N2}$ each independently represents C$_{1-12}$ linear alkyl or C$_{3-12}$ branched alkyl,

wherein one or more nonadjacent —CH$_2$— in the C$_{1-12}$ linear alkyl or C$_{3-12}$ branched alkyl can each be independently replaced by —CH=CH—, —C≡C—, —O—, —CO—, —CO—O— or —O—CO—;

ring

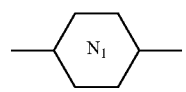

and ring

each independently represents or

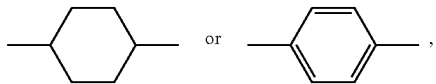

wherein one or more —CH$_2$— on

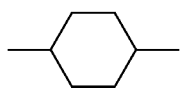

in the rings

and

can be replaced by —O—, and one or more single bond in the ring can be replaced by double bond, wherein one or more —H on

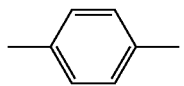

in the rings

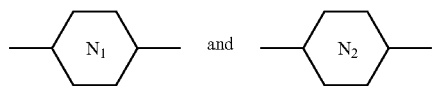

can each be independently substituted by —F, —Cl, —CN, —CH$_3$ or —OCH$_3$, and one or more —CH═ in the ring can be replaced by —N═;

$Z_{N1}$ and $Z_{N2}$ each independently represents single bond, —CO—O—, —O—CO—, —CH$_2$O—, —OCH$_2$—, —CH═CH—, —C≡C—, —CH$_2$CH$_2$—, —CF$_2$CF$_2$—, —(CH$_2$)$_4$—, —CF$_2$O— or —OCF$_2$—;

$L_{N1}$ and $L_{N2}$ each independently represents —H, C$_{1-3}$ alkyl or halogen;

$n_{N1}$ represents 0, 1, 2 or 3, $n_{N2}$ represents 0 or 1, and $0 \leq n_{N1}+n_{N2} \leq 3$, wherein when $n_{N1}$=2 N$_1$ or 3, ring

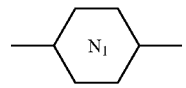

can be same or different, $Z_{N1}$ can be same or different;

when $0 \leq n_{N1}+n_{N2} \leq 2$, compounds of general formula N do not comprise terphenyl structure; and when $n_{N1}+n_{N2}$=3, compounds of general formula N do not comprise quaterphenyl structure.

9. A liquid crystal display device comprising the liquid crystal composition of claim 1.

10. A liquid crystal composition, wherein the liquid crystal composition comprises:

at least one compound of general formula I

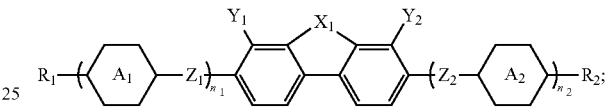

at least one compound of general formulas II-1, II-2, II-5, II-6, II-7, and II-11 selected from the group consisting of:

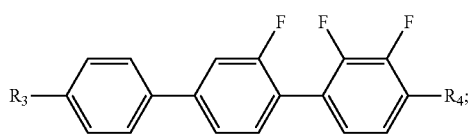

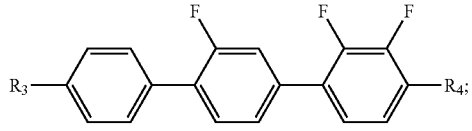

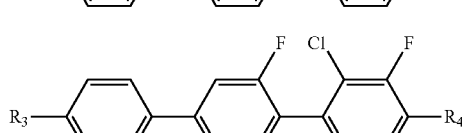

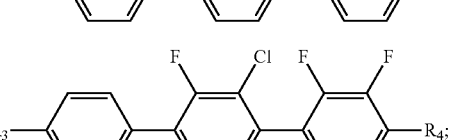

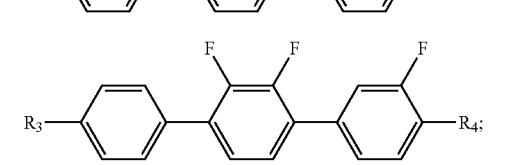

at least one compound of general formula III-1

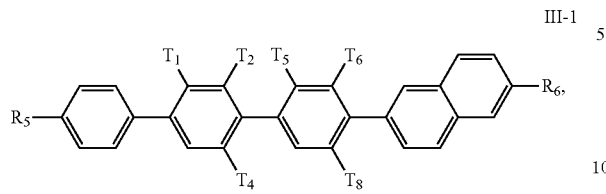

in which,

R₁ represents —H;

R₂ represents —H, halogen, $C_{1-12}$ linear alkyl or $C_{3-12}$ branched alkyl,

wherein one or more nonadjacent —CH₂— in the $C_{1-12}$ linear alkyl or $C_{3-12}$ branched alkyl can each be independently replaced by —CH=CH—, —C≡C—, —O—, —CO—, —CO—O— or —O—CO—, and one or more —H in

can each be independently substituted by —F or —Cl;

R₃ and R₄ each independently represents $C_{1-12}$ linear alkyl or $C_{3-12}$ branched alkyl,

wherein one or more nonadjacent —CH₂— in the $C_{1-12}$ linear alkyl or $C_{3-12}$ branched alkyl can each be independently replaced by —CH=CH—, —C≡C—, —O—, —CO—, —CO—O— or —O—CO—;

ring

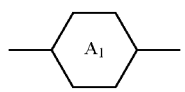

represents

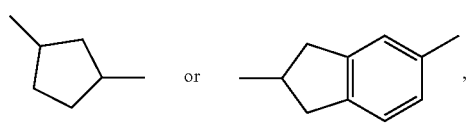

wherein one or more —CH₂— in

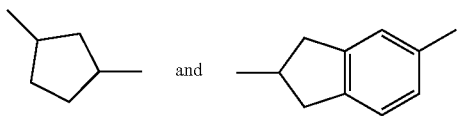

can be replaced by —O—, and one or more single bond in the rings can be replaced by double bond, wherein one or more —H on

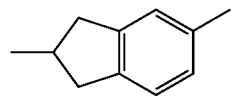

in the ring

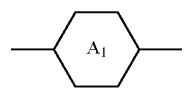

can each be independently substituted by —F, —Cl, —CN, —CH₃ or —OCH₃, and one or more —CH= in the ring

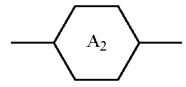

can be replaced by —N=;

ring

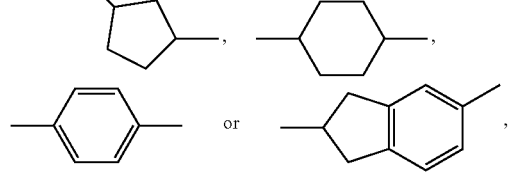

represent

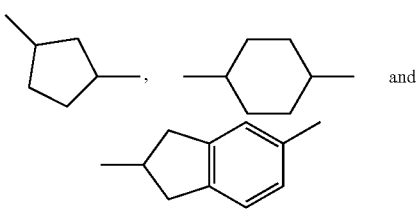

wherein one or more —CH₂— in can be replaced by —O—, and one or more single bond in the rings can be replaced by double bond, wherein one or more —H on

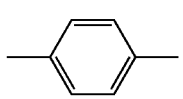 and 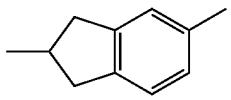

in the ring

can each be independently substituted by —F, —Cl, —CN, —CH$_3$ or —OCH$_3$, and one or more —CH= in the ring

can be replaced by —N=;
X$_1$ represents —O—, —S—, —CO—, —CF$_2$—, —NH— or —NF—;
Y$_1$ and Y$_2$ each independently represents —H, halogen, C$_{1-3}$ halogenated or unhalogenated alkyl, or C$_{1-3}$ halogenated or unhalogenated alkoxy;
Z$_1$ and Z$_2$ each independently represents single bond, —O—, —S—, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;
T$_1$, T$_2$, T$_4$, T$_5$, T$_6$, and T$_8$ each independently represents —H, —F, —Cl, —CN, —CH$_3$ or —OCH$_3$;
R$_5$ and R$_6$ each independently represents C$_{1-10}$ linear alkyl or C$_{3-10}$ branched alkyl,

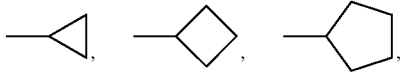

C$_{1-9}$ linear alkyl or C$_{3-9}$ branched alkoxy, or C$_{2-10}$ linear alkyl or C$_{3-10}$ branched alkenyl; and
n$_1$ represents 1 or 2, n$_2$ represents 1 or 2, wherein when n$_1$=2, ring

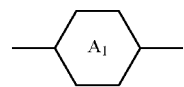

can be same or different, and Z$_1$ can be same or different; wherein when n$_2$=2, ring

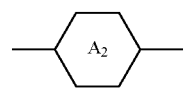

can be same or different, and Z$_2$ can be same or different.

* * * * *